(12) United States Patent
Ichikawa et al.

(10) Patent No.: US 9,373,971 B2
(45) Date of Patent: Jun. 21, 2016

(54) VEHICLE, POWER TRANSMITTING DEVICE AND CONTACTLESS POWER SUPPLY SYSTEM

(71) Applicants: Shinji Ichikawa, Toyota (JP); Tadashi Kondo, Okazaki (JP); Naoki Gorai, Toyota (JP)

(72) Inventors: Shinji Ichikawa, Toyota (JP); Tadashi Kondo, Okazaki (JP); Naoki Gorai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 388 days.

(21) Appl. No.: 13/860,962

(22) Filed: Apr. 11, 2013

(65) Prior Publication Data

US 2013/0307471 A1  Nov. 21, 2013

(30) Foreign Application Priority Data

May 21, 2012 (JP) .................................. 2012-115417

(51) Int. Cl.
*H02J 7/00* (2006.01)
*H02J 7/14* (2006.01)
(Continued)

(52) U.S. Cl.
CPC ............... *H02J 7/007* (2013.01); *B60L 11/005* (2013.01); *B60L 11/14* (2013.01); *B60L 11/182* (2013.01); *B60L 11/1833* (2013.01); *B60L 15/2009* (2013.01); *H02J 7/025* (2013.01); *B60L 2210/10* (2013.01); *B60L 2210/30* (2013.01); *B60L 2210/40* (2013.01); *B60L 2220/14* (2013.01); *B60L 2240/423* (2013.01); *H02J 5/005* (2013.01); *Y02T 10/645* (2013.01); *Y02T 10/70* (2013.01); *Y02T 10/7005* (2013.01); *Y02T 10/7022* (2013.01); *Y02T 10/7072* (2013.01);
(Continued)

(58) Field of Classification Search
USPC .......... 320/108, 109, 104; 324/300, 322, 600, 324/311; 307/104, 10.1, 149, 39, 82, 84
See application file for complete search history.

(56) References Cited

U.S. PATENT DOCUMENTS

2010/0295506 A1* 11/2010 Ichikawa .............. B60L 11/123
320/108
2011/0109263 A1* 5/2011 Sakoda ................. B60L 11/182
320/108
(Continued)

FOREIGN PATENT DOCUMENTS

JP  A-2011-120443  6/2011
JP  A-2011-223739  11/2011
(Continued)

OTHER PUBLICATIONS

Partial Translation of Office Action issued in Japanese Patent Application No. 2012-115417 dated Jun. 2, 2014.

*Primary Examiner* — Alexis A Boateng
(74) *Attorney, Agent, or Firm* — Oliff PLC

(57) ABSTRACT

A contactless power supply system contactlessly transmits electric power from a power transmitting device to a vehicle. The vehicle includes: a power receiving unit that contactlessly receives electric power from the power transmitting device; an electrical storage device that stores electric power received by the power receiving unit; and an impedance adjustment unit that includes a DC/DC converter and a relay and that is used to adjust an impedance between the power receiving unit and the electrical storage device. A vehicle ECU switches between a power supply path of which the impedance is adjusted by the DC/DC converter and a power supply path that does not use the DC/DC converter on the basis of a state of charge of the electrical storage device.

20 Claims, 16 Drawing Sheets

(51) Int. Cl.
*B60L 11/18* (2006.01)
*H02J 7/02* (2016.01)
*B60L 11/00* (2006.01)
*B60L 11/14* (2006.01)
*B60L 15/20* (2006.01)
*H02J 5/00* (2016.01)

(52) U.S. Cl.
CPC .......... *Y02T 10/7077* (2013.01); *Y02T 10/7216* (2013.01); *Y02T 10/7241* (2013.01); *Y02T 10/7275* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | | |
|---|---|---|---|---|
| 2011/0231029 A1* | 9/2011 | Ichikawa | .............. | B60L 11/123 700/298 |
| 2011/0241440 A1* | 10/2011 | Sakoda | ................... | H02J 5/005 307/104 |
| 2011/0248572 A1* | 10/2011 | Kozakai | ................. | H03F 1/565 307/104 |
| 2011/0266882 A1* | 11/2011 | Yamamoto | .............. | H02J 17/00 307/104 |
| 2012/0286726 A1* | 11/2012 | Kim | ...................... | B60L 11/182 320/108 |
| 2012/0299390 A1* | 11/2012 | Kim | ...................... | B60L 11/182 307/104 |
| 2013/0057208 A1* | 3/2013 | Takada | .................. | B60L 11/182 320/108 |

FOREIGN PATENT DOCUMENTS

| | | |
|---|---|---|
| JP | B2-4868077 | 2/2012 |
| JP | A-2012-138976 | 7/2012 |
| JP | A-2013-172560 | 9/2013 |
| WO | WO 2011/138860 A1 | 11/2011 |
| WO | WO 2011/142418 A1 | 11/2011 |
| WO | WO 2012/020475 A1 | 2/2012 |

* cited by examiner

F I G . 18
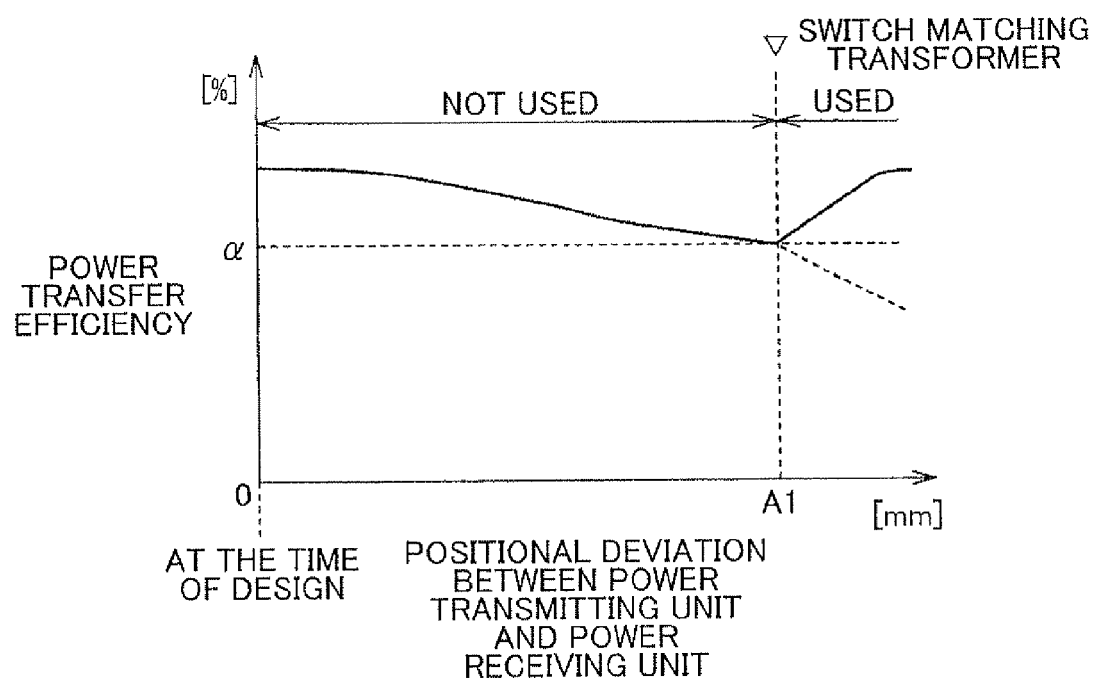

VEHICLE, POWER TRANSMITTING DEVICE AND CONTACTLESS POWER SUPPLY SYSTEM

INCORPORATION BY REFERENCE

The disclosure of Japanese Patent Application No. 2012-115417 filed on May 21, 2012 including the specification, drawings and abstract is incorporated herein by reference in its entirety.

BACKGROUND OF THE INVENTION

1. Field of the Invention

The invention relates to a vehicle, a power transmitting device and a contactless power supply system and, more particularly, to a technique for improving power transfer efficiency in a contactless power supply system.

2. Description of Related Art

In recent years, contactless wireless power transfer that does not use a power cord or a power transmission cable has become a focus of attention, and it has been suggested that the contactless wireless power transfer is applied to an electric vehicle, a hybrid vehicle, or the like, of which an in-vehicle electrical storage device is chargeable by a power supply outside the vehicle (hereinafter, also referred to as "external power supply").

In a contactless power supply system, in order to improve power transfer efficiency, it is important to match impedance between a power transmitting side and a power receiving side.

At the power receiving side of such a contactless power supply system, generally, an electrical storage device for storing received electric power is provided. As the state of charge of the electrical storage device varies, the input impedance of the power receiving side can vary accordingly.

Japanese Patent Application Publication No. 2011-120443 (JP 2011-120443 A) describes a contactless power transfer system that is configured to carry out impedance matching by varying the duty of a DC/DC converter, which converts received electric power and supplies the converted electric power to a battery, in synchronization with a variation in input impedance due to a load fluctuation in response to the state of charge of the battery.

With the technique described in JP 2011-120443 A, it is possible to suppress a decrease in power transfer efficiency due to a mismatch of impedance by adjusting the input impedance, which can vary with the state of charge of the battery, with the use of the DC/DC converter.

However, in order to make it possible to carry out impedance matching over all the fluctuation range of impedance, the DC/DC converter used is required to have specifications (rated power capacity, or the like) compatible with such impedance matching. This increases the size of the DC/DC converter itself, and also increases required cost. Furthermore, when the size of the DC/DC converter increases, a loss in driving the DC/DC converter also increases, so there is a concern that overall power transfer efficiency may also be influenced.

SUMMARY OF THE INVENTION

The invention provides a power transmitting device and a vehicle that are able to prevent a decrease in power transfer efficiency and also provides a contactless power supply system that includes the power transmitting device and the vehicle.

A first aspect of the invention provides a vehicle that is able to contactlessly receive electric power from a power transmitting device. The vehicle includes: a power receiving unit; an electrical storage device that is configured to store electric power received by the power receiving unit; and an impedance adjustment unit. The impedance adjustment unit is electrically connected between the power receiving unit and the electrical storage device, and is configured to adjust an impedance between the power receiving unit and the electrical storage device. The impedance adjustment unit is configured to switch an adjusted state of the impedance between a first adjusted state and a second adjusted state on the basis of a power transfer state from the power transmitting device to the power receiving unit. In the first adjusted state, electric power received by the power receiving unit is supplied to the electrical storage device in a state where the impedance is not adjusted.

The vehicle may further include a control unit that is configured to control the impedance adjustment unit. The control unit may be configured to switch between the first adjusted state and the second adjusted state on the basis of a magnitude of a charging electric power that is supplied to the electrical storage device.

The control unit may be configured to charge the electrical storage device with a first charging electric power or a second charging electric power that is smaller than the first charging electric power on the basis of a state of charge of the electrical storage device. The control unit may be configured to switch the impedance adjustment unit to the first adjusted state when the first charging electric power is used and to switch the impedance adjustment unit to the second adjusted state when the second charging electric power is used.

The vehicle may further include a control unit that is configured to control the impedance adjustment unit. The control unit may be configured to switch between the first adjusted state and the second adjusted state on the basis of a power transfer efficiency between the power transmitting device and the power receiving unit.

The control unit may be configured to, when the power transfer efficiency becomes lower than a predetermined threshold at the time when electric power is transferred in the first adjusted state, switch the impedance adjustment unit from the first adjusted state to the second adjusted state.

The vehicle may further include a rectifying unit that is configured to rectify electric power received by the power receiving unit. The impedance adjustment unit may include a DC/DC converter that is configured to convert a voltage from the rectifying unit and supply the converted voltage to the electrical storage device.

The vehicle may further include a rectifying unit that is configured to rectify electric power received by the power receiving unit. The impedance adjustment unit may include a matching transformer that is provided between the power receiving unit and the rectifying unit and that is configured to include at least one of a coil and a capacitor.

The impedance adjustment unit may include a switching unit that is configured to switch between the first adjusted state and the second adjusted state.

The vehicle may further include a control unit that is configured to control the switching unit. The control unit may be configured to determine whether there is an abnormality in the switching unit on the basis of a state of switching of the switching unit and a state of electric power that is supplied to the electrical storage device.

The power transmitting device may include a power transmitting unit that is configured to contactlessly supply electric power. A difference between a natural frequency of the power transmitting unit and a natural frequency of the power receiving unit may be smaller than or equal to ±10% of one of the natural frequency of the power transmitting unit and the natural frequency of the power receiving unit.

The power transmitting device may include a power transmitting unit that is configured to contactlessly supply electric power. A coupling coefficient between the power transmitting unit and the power receiving unit may be smaller than or equal to 0.1.

The power transmitting device may include a power transmitting unit that is configured to contactlessly supply electric power. The power receiving unit may be configured to receive electric power from the power transmitting unit through at least one of a magnetic field that is formed between the power receiving unit and the power transmitting unit and that oscillates at a predetermined frequency and an electric field that is formed between the power receiving unit and the power transmitting unit and that oscillates at a predetermined frequency.

Another aspect of the invention provides a power transmitting device that includes: a power supply unit; a power transmitting unit that is configured to contactlessly supply electric power, which is supplied from the power supply unit, to a power receiving device; and an impedance adjustment unit. The impedance adjustment unit is electrically connected between the power supply unit and the power transmitting unit, and is configured to adjust an impedance between the power supply unit and the power transmitting unit. The impedance adjustment unit is configured to switch an adjusted state of the impedance between a first adjusted state and a second adjusted state on the basis of a power transfer state from the power transmitting unit to the power receiving device.

The power transmitting device may further include a control unit that is configured to control the impedance adjustment unit. The control unit may be configured to switch between the first adjusted state and the second adjusted state on the basis of an electric power output from the power supply unit. In the first adjusted state, electric power from the power supply unit may be supplied to the power transmitting unit in a state where the impedance is not adjusted. The control unit may be configured to switch between the first adjusted state and the second adjusted state on the basis of a positional deviation between the power transmitting unit and the power receiving unit.

The power transmitting device may further include a control unit that is configured to control the impedance adjustment unit. The control unit may be configured to switch between the first adjusted state and the second adjusted state on the basis of a power transfer efficiency between the power transmitting unit and the power receiving device.

In the first adjusted state, electric power from the power supply unit may be supplied to the power transmitting unit in a state where the impedance is not adjusted, Further another aspect of the invention provides a contactless power supply system that contactlessly supplies electric power between a power transmitting device and a vehicle. The power transmitting device includes: a power supply unit; a power transmitting unit that is configured to contactlessly supply electric power, supplied from the power supply unit, to the vehicle; and a first impedance adjustment unit. The first impedance adjustment unit is electrically connected between the power supply unit and the power transmitting unit. The first impedance adjustment unit is configured to adjust an impedance between the power supply unit and the power transmitting unit, and is configured to switch an adjusted state of the impedance between a first adjusted state and a second adjusted state on the basis of a power transfer state from the power transmitting device to the vehicle. In the first adjusted state, electric power from the power supply unit may be supplied to the power transmitting unit in a state where the impedance is not adjusted. The vehicle includes: a power receiving unit that is configured to contactlessly receive electric power from the power transmitting unit; an electrical storage device that is configured to store electric power received by the power receiving unit; and a second impedance adjustment unit. The second impedance adjustment unit is electrically connected between the power receiving unit and the electrical storage device. The second impedance adjustment unit is configured to adjust an impedance between the power receiving unit and the electrical storage device, and is configured to switch an adjusted state of the impedance between a third adjusted state and a fourth adjusted state on the basis of the power transfer state from the power transmitting device to the vehicle. In the third adjusted state, electric power received by the power receiving unit is supplied to the electrical storage device in a state where the impedance is not adjusted.

The contactless power supply system may further include a control unit that is configured to control the first and second impedance adjustment units. The control unit may be configured to adjust a mismatch of the impedance due to a positional deviation between the power transmitting unit and the power receiving unit with the use of the first impedance adjustment unit and to adjust a mismatch of the impedance due to a load fluctuation during charging of the electrical storage device with the use of the second impedance adjustment unit.

According to the invention, it is possible to provide a contactless power supply system that is able to efficiently prevent a decrease in power transfer efficiency.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 18 is a graph for illustrating the correlation between a relative positional deviation between a power transmitting unit and a power receiving unit and a power transfer efficiency;

DETAILED DESCRIPTION OF EMBODIMENTS

Figure 1:
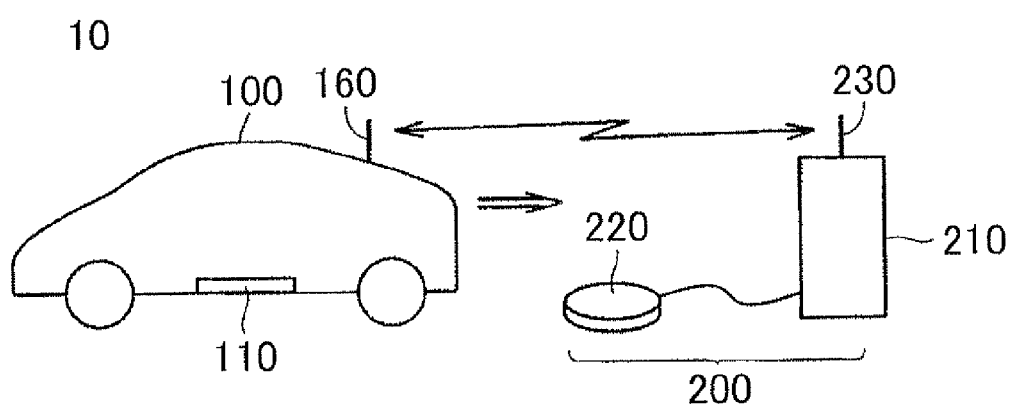
FIG. 1 is an overall configuration view of a vehicle power supply system according to an embodiment of the invention.

Hereinafter, embodiments of the invention will be described in detail with reference to the accompanying drawings. Note that like reference numerals denote the same or corresponding components in the drawings, and the description thereof is not repeated.

The configuration of a contactless power supply system according to a first embodiment will be described. FIG. 1 is an overall configuration view of a vehicle power supply system (contactless power supply system) 10 according to the embodiment of the invention. As shown in FIG. 1, the vehicle power supply system 10 includes a vehicle 100 and a power transmitting device 200. The vehicle 100 includes a power receiving device. The power receiving device includes a power receiving unit 110, a communication unit 160 and a control unit 300. The power transmitting device 200 includes a power supply device 210, a power transmitting unit 220, and a communication unit 230.

The power receiving unit 110 is, for example, installed at a vehicle body bottom face, and contactlessly receives high-frequency alternating-current power via an electromagnetic field. The high-frequency alternating-current power is output from the power transmitting unit 220 of the power transmitting device 200. Note that the configuration of the power receiving unit 110 will be described later together with the configuration of the power transmitting unit 220 and power transfer from the power transmitting unit 220 to the power receiving unit 110. The communication unit 160 is a communication interface by which the vehicle 100 communicates with the power transmitting device 200.

The power supply device 210 of the power transmitting device 200 generates alternating-current power having a predetermined frequency. For example, the power supply device 210 generates high-frequency alternating-current power upon reception of electric power from a system power supply (not shown), and supplies the generated alternating-current power to the power transmitting unit 220.

The power transmitting unit 220 is installed at a floor face of a parking lot, and receives high-frequency alternating-current power supplied from the power supply device 210. Then, the power transmitting unit 220 contactlessly outputs electric power to the power receiving unit 110 of the vehicle 100 via an electromagnetic field that is generated around the power transmitting unit 220. Note that the detailed configuration of the power transmitting unit 220 will also be described later together with the configuration of the power receiving unit 110 and power transfer from the power transmitting unit 220 to the power receiving unit 110. The communication unit 230 is a communication interface by which the power transmitting device 200 carries out communication with the vehicle 100.

In the vehicle power supply system 10, electric power is contactlessly transferred from the power transmitting unit 220 of the power transmitting device 200 to the power receiving unit 110 of the vehicle 100.

Figure 2:
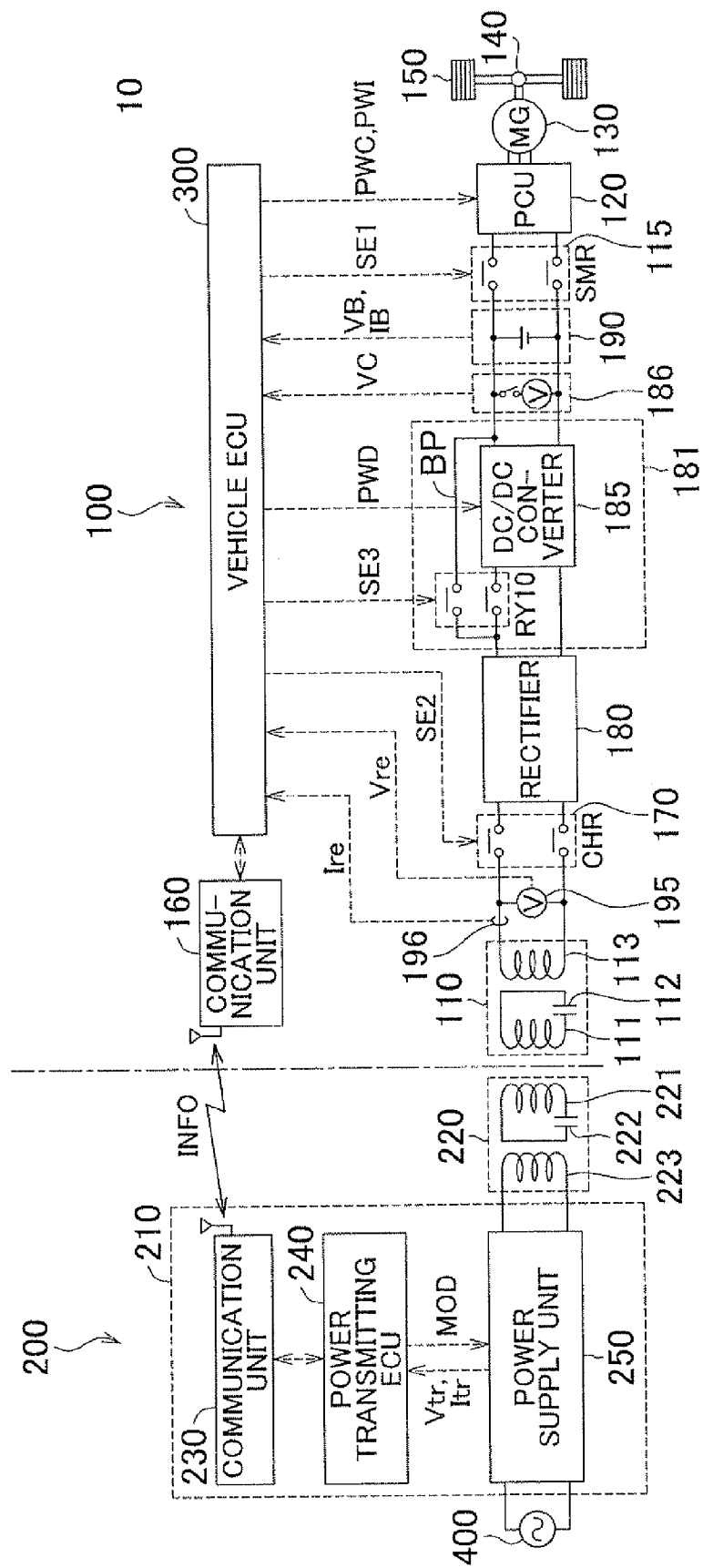
FIG. 2 is a functional block diagram that illustrates the detailed configuration of a vehicle and a power transmitting device in a first embodiment.

FIG. 2 is a detailed configuration diagram of the vehicle power supply system 10 shown in FIG. 1. As shown in FIG. 2, the power transmitting device 200 includes the power supply device 210 and the power transmitting unit 220 as described above. The power supply device 210 further includes a power transmitting ECU 240 and a power supply unit 250 in addition to the communication unit 230. The power transmitting ECU 240 serves as a control unit. The power transmitting unit 220 includes a resonance coil 221, a capacitor 222 and an electromagnetic induction coil 223.

The power supply unit 250 is controlled by a control signal MOD from the power transmitting ECU 240, and converts electric power, received from the alternating-current power supply, such as a commercial power supply 400, to high-frequency electric power. Then, the power supply unit 250 supplies the converted high-frequency electric power to the electromagnetic induction coil 223.

The power supply unit 250 outputs a power transmission voltage Vtr that is detected by a voltage sensor (not shown) and a power transmission current Itr that is detected by a current sensor (not shown) to the power transmitting ECU 240.

The electromagnetic induction coil 223 is able to be magnetically coupled to the resonance coil 221 through electromagnetic induction. The electromagnetic induction coil 223 transmits high-frequency electric power, which is supplied from the power supply unit 250, to the resonance coil 221 through electromagnetic induction.

The resonance coil 221 contactlessly transfers electric power, which is transmitted from the electromagnetic induction coil 223, to a resonance coil 111 that is included in the power receiving unit 110 of the vehicle 100. Note that power transfer between the power receiving unit 110 and the power transmitting unit 220 will be described later with reference to FIG. 3.

As described above, the communication unit 230 is a communication interface for carrying out wireless communication between the power transmitting device 200 and the vehicle 100. The communication unit 230 exchanges information INFO with the communication unit 160. The communication unit 230 receives vehicle information and a signal, or the like, for instructions to start or stop transmission of electric power, which are transmitted from the communication unit 160 of the vehicle 100, and outputs the received pieces of information to the power transmitting ECU 240. The communication unit 230 transmits information about the power transmission voltage Vtr, the power transmission current Itr, and the like, input from the power transmitting ECU 240, to the vehicle 100.

The power transmitting ECU 240 includes a central processing unit (CPU), a storage device and an input/output buffer (which are not shown in FIG. 1). The power transmitting ECU 240 receives signals from sensors, or the like, and outputs control signals to various devices to thereby control various devices in the power supply device 210. Note that control over the vehicle 100 and the devices are not only limited to processing by software but may also be processed by exclusive hardware (electronic circuit).

The vehicle 100 includes a charging relay (CHR) 170, a rectifier 180, an impedance adjustment unit 181, a voltage detecting unit 186, an electrical storage device 190, a system main relay (SMR) 115, a power control unit (PCU) 120, a motor generator 130, a power transmission gear 140, drive wheels 150, a vehicle electronic control unit (ECU) 300 that serves as a control unit, a voltage sensor 195 and a current sensor 196 in addition to the power receiving unit 110 and the communication unit 160. The power receiving unit 110 includes the resonance coil 111, a capacitor 112 and an electromagnetic induction coil 113. The impedance adjustment unit 181 includes a DC/DC converter 185 and a relay RY10 that serves as a switching unit.

Note that, in the present embodiment, an electric vehicle is, for example, described as the vehicle 100; however, the configuration of the vehicle 100 is not limited to the electric vehicle as long as the vehicle is able to travel using electric power stored in the electrical storage device. Another example of the vehicle 100 includes a hybrid vehicle equipped with an engine, a fuel cell vehicle equipped with a fuel cell, and the like.

The resonance coil 111 contactlessly receives electric power from the resonance coil 221 included in the power transmitting device 200.

The electromagnetic induction coil 113 is able to be magnetically coupled to the resonance coil 111 through electromagnetic induction. The electromagnetic induction coil 113 extracts electric power, received by the resonance coil 111, through electromagnetic induction, and outputs the extracted electric power to the rectifier 180.

The rectifier 180 rectifies alternating-current power received from the electromagnetic induction coil 113 via the CHR 170, and outputs the rectified direct-current power to the electrical storage device 190. The rectifier 180 may be, for example, formed to include a diode bridge and a smoothing capacitor (both are not shown). The rectifier 180 may be a so-called switching regulator that rectifies alternating current using switching control. When the rectifier 180 is included in the power receiving unit 110, in order to prevent erroneous operation, or the like, of switching elements caused by a generated electromagnetic field, the rectifier 180 is desirably a static rectifier, such as a diode bridge.

The CHR 170 is electrically connected between the power receiving unit 110 and the rectifier 180. The CHR 170 is controlled by a control signal SE2 from the vehicle ECU 300, and switches between supply and interruption of electric power from the power receiving unit 110 to the rectifier 180.

The DC/DC converter 185 is, for example, a voltage converter, such as a switching regulator. The DC/DC converter 185 is controlled by a control signal PWD from the vehicle ECU 300, converts direct-current voltage from the rectifier 180, and supplies the converted direct-current voltage to the electrical storage device 190. As will be described later, by changing the duty of the DC/DC converter 185, it is possible to adjust the impedance of a power receiving side (vehicle) with respect to the power transmitting device 200.

The relay RY10 is electrically connected between the DC/DC converter 185 and the rectifier 180. The relay RY10 includes a relay that is provided in a positive electrode-side power path that connects the rectifier 180 to the DC/DC converter 185 and a relay that is provided in a bypass line BP that bypasses the DC/DC converter 185. These relays included in the RY10 are controlled by a control signal SE3 from the vehicle ECU 300, and, at the time of charging the electrical storage device 190, switches between transmission of electric power via the bypass line BP (first adjusted state) and transmission of electric power via the DC/DC converter 185 (second adjusted state). In FIG. 2, the relay RY10 is configured to switch only the positive electrode-side power path. Instead, in response to the configuration of the DC/DC converter 185, both the positive electrode-side and negative electrode-side power paths may be configured to be switched.

The electrical storage device 190 is an electric power storage element that is configured to be chargeable and dischargeable. The electrical storage device 190 is, for example, formed of a secondary battery, such as a lithium ion battery, a nickel-metal hydride battery and a lead-acid battery, or an electrical storage element, such as an electric double layer capacitor.

The electrical storage device 190 is connected to the rectifier 180. The electrical storage device 190 stores electric power that is received by the power receiving unit 110 and rectified by the rectifier 180. In addition, the electrical storage device 190 is also connected to the PCU 120 via the SMR 115. The electrical storage device 190 supplies electric power for generating vehicle driving force to the PCU 120. Furthermore, the electrical storage device 190 stores electric power generated by the motor generator 130. The output of the electrical storage device 190 is, for example, about 200 V.

A voltage sensor and a current sensor (both are not shown) are provided for the electrical storage device 190. The voltage sensor is used to detect the voltage VB of the electrical storage device 190. The current sensor is used to detect a current IB input to or output from the electrical storage device 190. These detected values are output to the vehicle ECU 300. The vehicle ECU 300 computes the state of charge (also referred to as "SOC") of the electrical storage device 190 on the basis of the voltage VB and the current IB.

The voltage detecting unit 186 is, for example, formed to include a serially connected switch and voltage sensor, and is able to detect a voltage between the power lines that connects the DC/DC converter 185 to the electrical storage device 190. The voltage detecting unit 186 is used to detect an abnormality in the relay RY10 as will be described later with reference to FIG. 13.

The SMR 115 is electrically connected between the electrical storage device 190 and the PCU 120. Then, the SMR 115 is controlled by a control signal SE1 from the vehicle ECU 300, and switches between supply and interruption of electric power between the electrical storage device 190 and the PCU 120.

The PCU 120 includes a converter and an inverter (both are not shown). The converter is controlled by a control signal PWC from the vehicle ECU 300, and converts voltage from the electrical storage device 190. The inverter is controlled by a control signal PWI from the vehicle ECU 300, and drives the motor generator 130 using electric power converted by the converter.

The motor generator 130 is an alternating-current rotating electrical machine, and is, for example, a permanent-magnet synchronous motor that includes a rotor in which a permanent magnet is embedded. The output torque of the motor generator 130 is transmitted to the drive wheels 150 via the power transmission gear 140. The vehicle 100 travels using the transmitted torque. The motor generator 130 is able to generate electric power using the rotational force of the drive wheels 150 during regenerative braking operation of the vehicle 100. Then, the generated electric power is converted by the PCU 120 to charging electric power to charge the electrical storage device 190.

In addition, in a hybrid vehicle equipped with an engine (not shown) in addition to the motor generator 130, the engine and the motor generator 130 are cooperatively operated to generate required vehicle driving force. In this case, the electrical storage device 190 may be charged with electric power generated through the rotation of the engine.

As described above, the communication unit 160 is a communication interface for carrying out wireless communication between the vehicle 100 and the power transmitting device 200. The communication unit 160 exchanges information INFO with the communication unit 230 of the power transmitting device 200. The information INFO that is output from the communication unit 160 to the power transmitting device 200 includes vehicle information from the vehicle ECU 300 and a signal for instructions to start or stop transmission of electric power.

The vehicle ECU 300 includes a CPU, a storage unit and an input/output buffer, which are not shown in FIG. 2. The vehicle ECU 300 receives signals from the sensors, and the like, outputs control signals to the devices, and controls the devices in the vehicle 100. Note that control over the vehicle 100 and the devices are not only limited to processing by software but may also be processed by exclusive hardware (electronic circuit).

The voltage sensor 195 is connected in parallel with the electromagnetic induction coil 113, and detects a power receiving voltage Vre received by the power receiving unit 110. The current sensor 196 is provided in a power line that connects the electromagnetic induction coil 113 to the CHR 170, and detects a power receiving current Ire. The detected power receiving voltage Vre and power receiving current Ire are transmitted to the vehicle ECU 300, and are used to, for example, compute a power transfer efficiency.

Note that, in FIG. 2, the power receiving unit 110 and the power transmitting unit 220 respectively include the electromagnetic induction coils 113 and 223; instead, the power receiving unit 110 and the power transmitting unit 220 respectively may not include the electromagnetic induction coils 113 and 223. In this case, although not shown in FIG. 2, the resonance coil 221 is connected to the power supply unit 250 in the power transmitting unit 220, and the resonance coil 111 is connected to the rectifier 180 via the CHR 170 in the power receiving unit 110.

Figure 3:
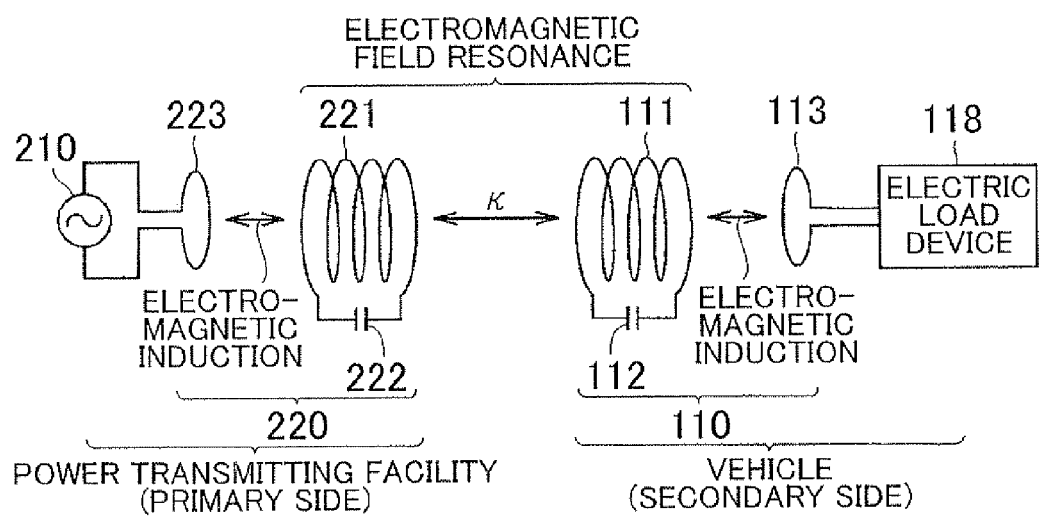
FIG. 3 is an equivalent circuit diagram at the time of power transfer from the power transmitting device to the vehicle in FIG. 2.

Next, the principle of power transfer will be described. FIG. 3 is an equivalent circuit diagram at the time of power transfer from the power transmitting device 200 to the vehicle 100. As shown in FIG. 3, the power transmitting unit 220 of the power transmitting device 200 includes the resonance coil 221, the capacitor 222 and the electromagnetic induction coil 223.

The electromagnetic induction coil 223 is, for example, provided substantially coaxially with the resonance coil 221 at a predetermined gap from the resonance coil 221. The electromagnetic induction coil 223 is magnetically coupled to the resonance coil 221 through electromagnetic induction, and supplies high-frequency electric power, which is supplied from the power supply device 210, to the resonance coil 221 through electromagnetic induction.

The resonance coil 221 forms an LC resonance circuit together with the capacitor 222. Note that, as will be described later, an LC resonance circuit is also formed in the power receiving unit 110 of the vehicle 100. The difference between the natural frequency of the LC resonance circuit formed of the resonance coil 221 and the capacitor 222 and the natural frequency of the LC resonance circuit of the power receiving unit 110 is smaller than or equal to ±10% of the natural frequency of any one of the former LC resonance circuit and the latter LC resonance circuit. Then, the resonance coil 221 receives electric power from the electromagnetic induction coil 223 through electromagnetic induction, and contactlessly transmits electric power to the power receiving unit 110 of the vehicle 100.

The electromagnetic induction coil 223 is provided in order to easily supply electric power from the power supply device 210 to the resonance coil 221. The power supply device 210 may be directly connected to the resonance coil 221 without providing the electromagnetic induction coil 223. In addition, the capacitor 222 is provided in order to adjust the natural frequency of the resonance circuit. When a desired natural frequency is obtained by utilizing the stray capacitance of the resonance coil 221, it is not necessary to provide the capacitor 222.

The power receiving unit 110 of the vehicle 100 includes the resonance coil 111, the capacitor 112 and the electromagnetic induction coil 113. The resonance coil 111 forms an LC resonance circuit together with the capacitor 112. As described above, the difference between the natural frequency of the LC resonance circuit formed of the resonance coil 111 and the capacitor 112 and the natural frequency of the LC resonance circuit formed of the resonance coil 221 and the capacitor 222 in the power transmitting unit 220 of the power transmitting device 200 is smaller than or equal to ±10% of the natural frequency of any one of the former LC resonance circuit and the latter LC resonance circuit. The resonance coil 111 contactlessly receives electric power from the power transmitting unit 220 of the power transmitting device 200.

The electromagnetic induction coil 113 is, for example, provided substantially coaxially with the resonance coil 111 at a predetermined gap from the resonance coil 111. The electromagnetic induction coil 113 is magnetically coupled to the resonance coil 111 through electromagnetic induction, extracts electric power, received by the resonance coil 111, through electromagnetic induction, and outputs the extracted electric power to the electric load device 118. Note that an electric load device 118 is an electrical device that utilizes electric power received by the power receiving unit 110, and specifically collectively indicates electrical devices downstream of the rectifier 180 (FIG. 2).

The electromagnetic induction coil 113 is provided in order to easily extract electric power from the resonance coil 111. The rectifier 180 may be directly connected to the resonance coil 111 without providing the electromagnetic induction coil 113. In addition, the capacitor 112 is provided in order to adjust the natural frequency of the resonance circuit. When a desired natural frequency is obtained by utilizing the stray capacitance of the resonance coil 111, it is not necessary to provide the capacitor 112.

In the power transmitting device 200, high-frequency alternating-current power is supplied from the power supply device 210 to the electromagnetic induction coil 223, and electric power is supplied from the electromagnetic induction coil 223 to the resonance coil 221. By so doing, energy (electric power) is transferred from the resonance coil 221 to the resonance coil 111 through a magnetic field formed between the resonance coil 221 and the resonance coil 111 of the vehicle 100. Energy (electric power) transferred to the resonance coil 111 is extracted with the use of the electromagnetic induction coil 113, and is transferred to the electric load device 118 of the vehicle 100.

As described above, in the power transfer system, the difference between the natural frequency of the power transmitting unit 220 of the power transmitting device 200 and the natural frequency of the power receiving unit 110 of the vehicle 100 is smaller than or equal to ±10% of the natural frequency of one of the power transmitting unit 220 and the power receiving unit 110. By setting the natural frequency of each of the power transmitting unit 220 and the power receiving unit 110 within the above range, it is possible to increase the power transfer efficiency. On the other hand, when the above-described difference in natural frequency is larger than ±10%, the power transfer efficiency becomes lower than 10%, so there may occur an inconvenience, such as an increase in the duration of a power transfer time.

Note that the natural frequency of the power transmitting unit 220 (power receiving unit 110) means an oscillation frequency in the case where the electric circuit (resonance circuit) that constitutes the power transmitting unit 220 (power receiving unit 110) freely oscillates. Note that, in the electric circuit (resonance circuit) that constitutes the power transmitting unit 220 (power receiving unit 110), the natural frequency at the time when braking force or electrical resistance is substantially zero is also called the resonance frequency of the power transmitting unit 220 (power receiving unit 110).

Figure 4:
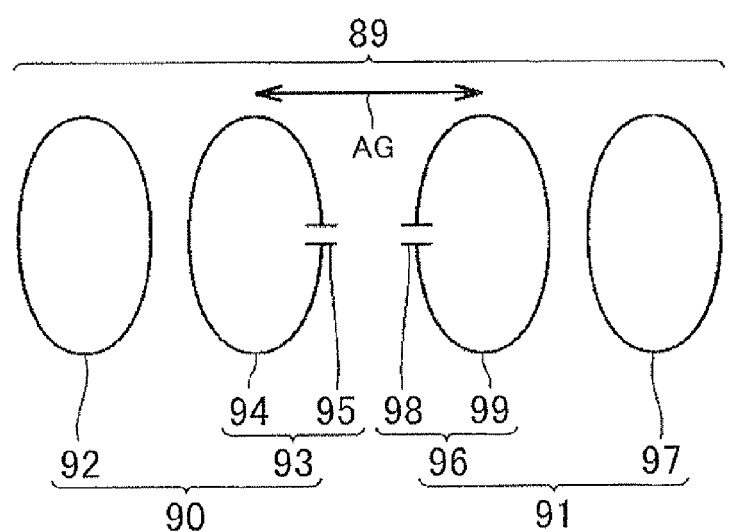
FIG. 4 is a view that shows a simulation model of a power transfer system.
Figure 5:
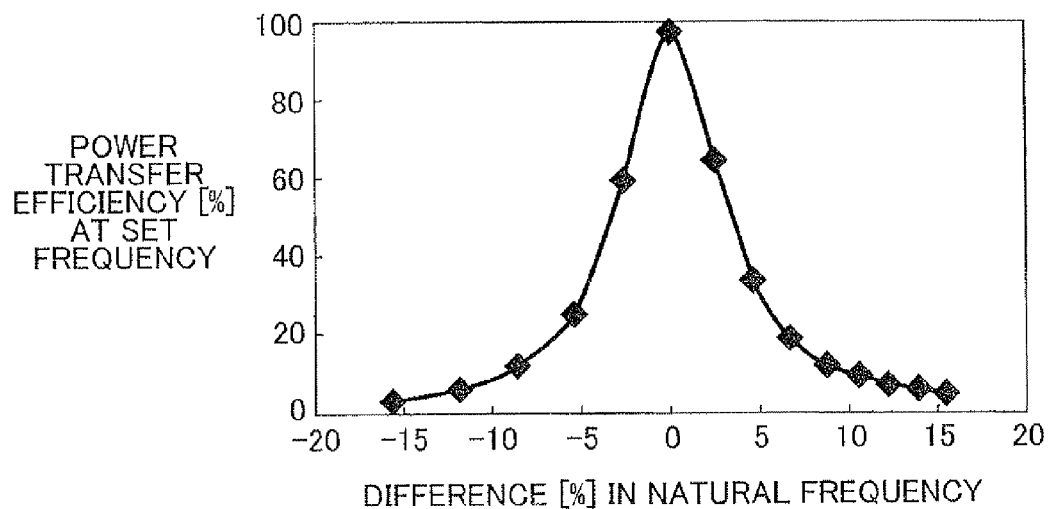
FIG. 5 is a graph that shows the correlation between a difference in natural frequency of each of a power transmitting unit and a power receiving unit and a power transfer efficiency.

The simulation result obtained by analyzing the correlation between a difference in natural frequency and a power transfer efficiency will be described with reference to FIG. 4 and FIG. 5. FIG. 4 is a view that shows a simulation model of a power transfer system; In addition, FIG. 5 is a graph that shows the correlation between a difference in the natural frequency of each of the power transmitting unit and the power receiving unit and a power transfer efficiency.

As shown in FIG. 4, the power transfer system 89 includes a power transmitting unit 90 and a power receiving unit 91. The power transmitting unit 90 includes a first coil 92 and a second coil 93. The second coil 93 includes a resonance coil 94 and a capacitor 95 that is provided in the resonance coil 94. The power receiving unit 91 includes a third coil 96 and a fourth coil 97. The third coil 96 includes a resonance coil 99 and a capacitor 98 that is connected to the resonance coil 99.

The inductance of the resonance coil 94 is set to Lt, and the capacitance of the capacitor 95 is set to C1. In addition, the inductance of the resonance coil 99 is set to Lr, and the capacitance of the capacitor 98 is set to C2. When the parameters are set in this way, the natural frequency f1 of the second coil 93 is expressed by the following mathematical expression (1), and the natural frequency f2 of the third coil 96 is expressed by the following mathematical expression (2).

$$f1 = 1/\{2\pi(Lt \times C1)^{1/2}\} \quad (1)$$

$$f2 = 1/\{2\pi(Lr \times C2)^{1/2}\} \quad (2)$$

Here, in the case where the inductance Lr and the capacitances C1 and C2 are fixed and only the inductance Lt is varied, the correlation between a difference in natural frequency between the second coil 93 and the third coil 96 and a power transfer efficiency is shown in FIG. 5. Note that, in this simulation, a relative positional relationship between the resonance coil 94 and the resonance coil 99 is fixed, and, furthermore, the frequency of current that is supplied to the second coil 93 is constant.

As shown in FIG. 5, the abscissa axis represents a difference Df (%) in natural frequency, and the ordinate axis represents a power transfer efficiency (%) at a current having a set frequency. The difference Df (%) in natural frequency is expressed by the following mathematical expression (3).

$$\text{(Difference in Natural Frequency)} = \{(f1-f2)/f2\} \times 100 \text{ (\%)} \quad (3)$$

As is apparent from FIG. 5, when the difference (%) in natural frequency is 0%, the power transfer efficiency is close to 100%. When the difference (%) in natural frequency is ±5%, the power transfer efficiency is about 40%. When the difference (%) in natural frequency is ±10%, the power transfer efficiency is about 10%. When the difference (%) in natural frequency is ±15%, the power transfer efficiency is about 5%. That is, it is found that, by setting the natural frequency of each of the second coil 93 and the third coil 96 such that the absolute value of the difference (%) in natural frequency (difference in natural frequency) falls at or below 10% of the natural frequency of the third coil 96, it is possible to increase the power transfer efficiency to a practical level. Furthermore, by setting the natural frequency of each of the second coil 93 and the third coil 96 such that the absolute value of the difference (%) in natural frequency is smaller than or equal to 5% of the natural frequency of the third coil 96, it is possible to further increase the power transfer efficiency, so it is more desirable. Note that the electromagnetic field analyzation software application (JMAG (trademark): produced by JSOL Corporation) is employed as a simulation software application.

Referring back to FIG. 2, the power transmitting unit 220 of the power transmitting device 200 and the power receiving unit 110 of the vehicle 100 contactlessly exchange electric power through at least one of a magnetic field and an electric field. The magnetic field is formed between the power transmitting unit 220 and the power receiving unit 110, and oscillates at a predetermined frequency. The electric field is formed between the power transmitting unit 220 and the power receiving unit 110, and oscillates at a predetermined frequency. A coupling coefficient κ between the power transmitting unit 220 and the power receiving unit 110 is desirably smaller than or equal to 0.1. By resonating the power transmitting unit 220 and the power receiving unit 110 through the electromagnetic field, electric power is transferred from the power transmitting unit 220 to the power receiving unit 110.

Here, the magnetic field having the predetermined frequency, which is formed around the power transmitting unit 220, will be described. The "magnetic field having the predetermined frequency" typically correlates with the power transfer efficiency and the frequency of current that is supplied to the power transmitting unit 220. Then, first, the correlation between the power transfer efficiency and the frequency of current that is supplied to the power transmitting unit 220 will be described. The power transfer efficiency at the time when electric power is transferred from the power transmitting unit 220 to the power receiving unit 110 varies depending on various factors, such as a distance between the power transmitting unit 220 and the power receiving unit 110. For example, the natural frequency (resonance frequency) of each of the power transmitting unit 220 and the power receiving unit 110 is set to f0, the frequency of current that is supplied to the power transmitting unit 220 is set to f3, and the air gap between the power transmitting unit 220 and the power receiving unit 110 is set to AG.

Figure 6:
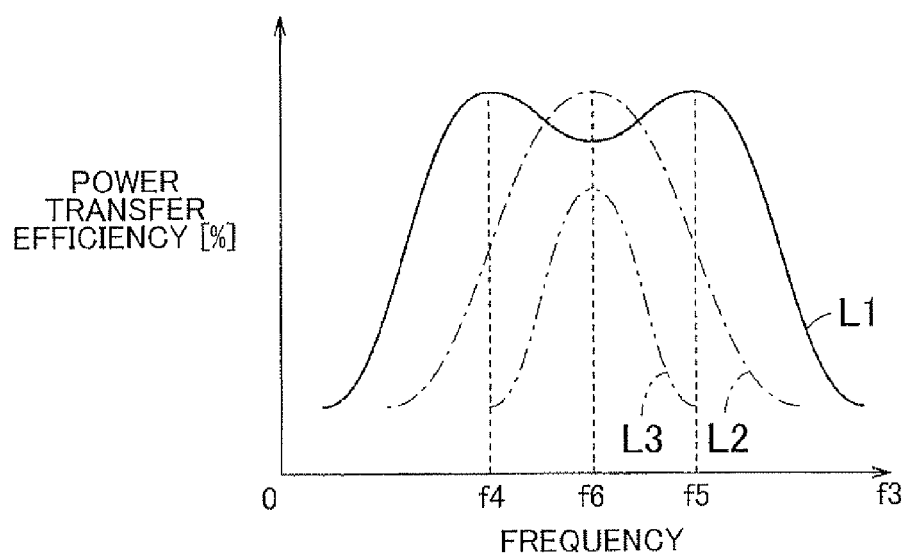
FIG. 6 is a graph that shows the correlation between a power transfer efficiency at the time when an air gap is varied and the frequency of a current that is supplied to the power transmitting unit in a state where the natural frequency is fixed in FIG. 2 and FIG. 3.

FIG. 6 is a graph that shows the correlation between a power transfer efficiency and the frequency f3 of current that is supplied to the power transmitting unit 220 at the time when the air gap AG is varied in a state where the natural frequency f0 is fixed. In FIG. 6, the abscissa axis represents the frequency f3 of current that is supplied to the power transmitting unit 220, and the ordinate axis represents a power transfer efficiency (%). An efficiency curve L1 schematically shows the correlation between a power transfer efficiency and the frequency f3 of current that is supplied to the power transmitting unit 220 when the air gap AG is small. As indicated by the efficiency curve L1, when the air gap AG is small, the peak of the power transfer efficiency appears at frequencies f4 and f5 (f4<f5). When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, and the power transfer efficiency becomes a peak when the frequency of current that is supplied to the power transmitting unit 220 is f6. When the air gap AG is further increased from the state of the efficiency curve L2, the peak of the power transfer efficiency reduces as indicated by an efficiency curve L3.

For example, the following methods are conceivable as a method of improving the power transfer efficiency. In a first method, by varying the capacitances of the capacitor 222 and capacitor 112 in accordance with the air gap AG while the frequency of current that is supplied to the power transmitting unit 220 is constant, the characteristic of power transfer efficiency between the power transmitting unit 220 and the power receiving unit 110 is varied. Specifically, the capacitances of the capacitor 222 and capacitor 112 are adjusted such that the power transfer efficiency becomes a peak in a state where the frequency of current that is supplied to the power transmitting unit 220 is constant. In this method, irrespective of the size of the air gap AG, the frequency of current flowing through the power transmitting unit 220 and the power receiving unit 110 is constant. As a method of varying the characteristic of power transfer efficiency, a method of utilizing a matching transformer (not shown), a method of utilizing the DC/DC converter 185 provided between the rectifier 180 and the electrical storage device 190 in the vehicle 100, or the like, may be employed.

In addition, in a second method, the frequency of current that is supplied to the power transmitting unit 220 is adjusted on the basis of the size of the air gap AG. For example, when the power transfer characteristic becomes the efficiency curve L1, current having the frequency f4 or the frequency f5 is supplied to the power transmitting unit 220. When the frequency characteristic becomes the efficiency curve L2 or L3, current having the frequency f6 is supplied to the power transmitting unit 220. In this case, the frequency of current flowing through the power transmitting unit 220 and the power receiving unit 110 is varied in accordance with the size of the air gap AG.

In the first method, the frequency of current flowing through the power transmitting unit 220 is a fixed constant frequency, and, in the second method, the frequency of current flowing through the power transmitting unit 220 is a frequency that appropriately varies with the air gap AG. Through the first method, the second method, or the like, current having the predetermined frequency set such that the power transfer efficiency is high is supplied to the power transmitting unit 220. When current having the predetermined frequency flows through the power transmitting unit 220, a magnetic field (electromagnetic field) that oscillates at the predetermined frequency is formed around the power transmitting unit 220. The power receiving unit 110 receives electric power from the power transmitting unit 220 through the magnetic field that is formed between the power receiving unit 110 and the power transmitting unit 220 and that oscillates at the predetermined frequency. Thus, the "magnetic field that oscillates at the predetermined frequency" is not necessarily a magnetic field having a fixed frequency. Note that, in the above-described embodiment, the frequency of current that is supplied to the power transmitting unit 220 is set by focusing on the air gap AG; however, the power transfer efficiency also varies on the basis of other factors, such as a deviation in the horizontal position between the power transmitting unit 220 and the power receiving unit 110, so the frequency of current that is supplied to the power transmitting unit 220 may possibly be adjusted on the basis of those other factors.

The above description is made on the example in which a helical coil is employed as each resonance coil; however, when an antenna, such as a meander line antenna, is employed as each resonance coil, current having the predetermined frequency flows through the power transmitting unit 220, and, therefore, an electric field having the predetermined frequency is formed around the power transmitting unit 220. Then, through the electric field, electric power is transferred between the power transmitting unit 220 and the power receiving unit 110.

In the power transfer system, a near field (evanescent field) in which the static electromagnetic field of an electromagnetic field is dominant is utilized. By so doing, power transmitting and power receiving efficiencies are improved.

Figure 7:
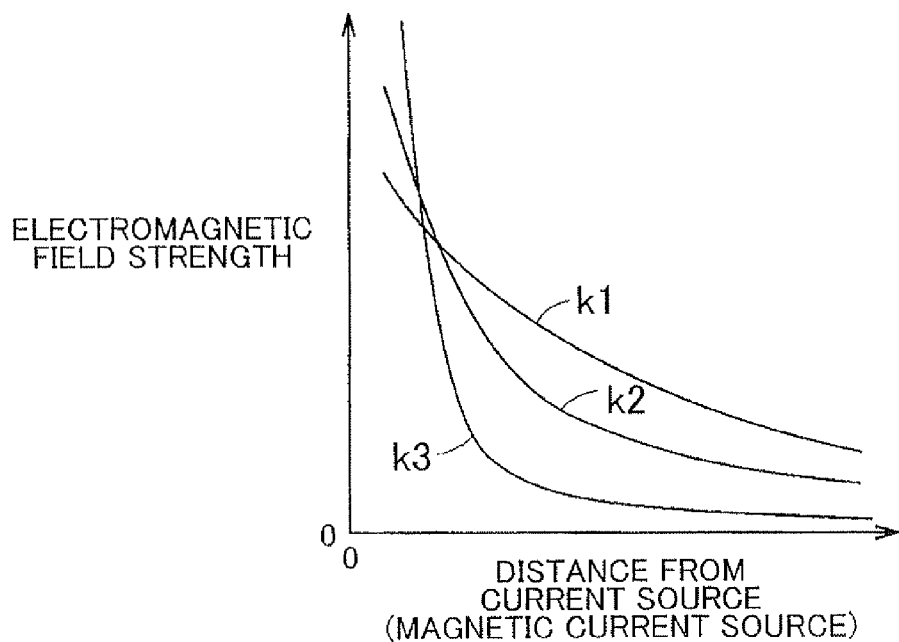
FIG. 7 is a graph that shows the correlation between a distance from a current source (magnetic current source) and the strength of an electromagnetic field in FIG. 2 and FIG. 3.

FIG. 7 is a graph that shows the relationship between a distance from a current source (magnetic current source) and the strength of an electromagnetic field. As shown in FIG. 7, the electromagnetic field consists of three components. The curve k1 is a component that is inversely proportional to the distance from a wave source, and is called radiation electromagnetic field. The curve k2 is a component that is inversely proportional to the square of the distance from the wave source, and is called induction electromagnetic field. In addition, the curve k3 is a component that is inversely proportional to the cube of the distance from the wave source, and is called static electromagnetic field. Where the wavelength of the electromagnetic field is $\lambda$, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic field steeply reduces with a distance from a wave source, and, in the power transfer system according to the present embodiment, a near field (evanescent field) in which the static electromagnetic field is dominant is utilized to transfer energy (electric power). That is, by resonating the power transmitting unit 220 and the power receiving unit 110 (for example, a pair of LC resonance coils) having the close natural frequencies in the near field in which the static electromagnetic field is dominant, energy (electric power) is transferred from the power transmitting unit 220 to the other power receiving unit 110. The static electromagnetic field does not propagate energy over a long distance, so the resonance method is able to transmit electric power with less loss of energy in comparison with an electromagnetic wave that transmits energy (electric power) through the radiation electromagnetic field that propagates energy over a long distance.

In this way, in the power transfer system, by resonating the power transmitting unit 220 and the power receiving unit 110 through the electromagnetic field, electric power is contactlessly transferred between the power transmitting unit 220 and the power receiving unit 110. Then, a coupling coefficient κ between the power transmitting unit 220 and the power receiving unit 110 is, for example, smaller than or equal to about 0.3, and is desirably smaller than or equal to 0.1. Of course, the coupling coefficient κ that ranges from about 0.1 to 0.3 may also be employed. The coupling coefficient κ is not limited to this value; it may be various values at which power transfer is good.

Note that coupling between the power transmitting unit 220 and the power receiving unit 110 in power transfer is, for example, called magnetic resonance coupling, magnetic field resonance coupling, electromagnetic field resonance coupling or electric field resonance coupling. The electromagnetic field resonance coupling means coupling that includes the magnetic resonance coupling, the magnetic field resonance coupling and the electric field resonance coupling.

When the power transmitting unit 220 and the power receiving unit 110 are formed of coils as described above, the power transmitting unit 220 and the power receiving unit 110 are mainly coupled through a magnetic field, and magnetic resonance coupling or magnetic field resonance coupling is formed. For example, an antenna, such as a meander line antenna, may be employed as each of the power transmitting unit 220 and the power receiving unit 110. In this case, the power transmitting unit 220 and the power receiving unit 110 are mainly coupled through an electric field, and electric field resonance coupling is formed.

Next, impedance adjustment control will be described. As described above, when the electrical storage device is charged using electric power from the outside of the vehicle, charging electric power may be changed depending on the state of charge of the electrical storage device.

Figure 8:
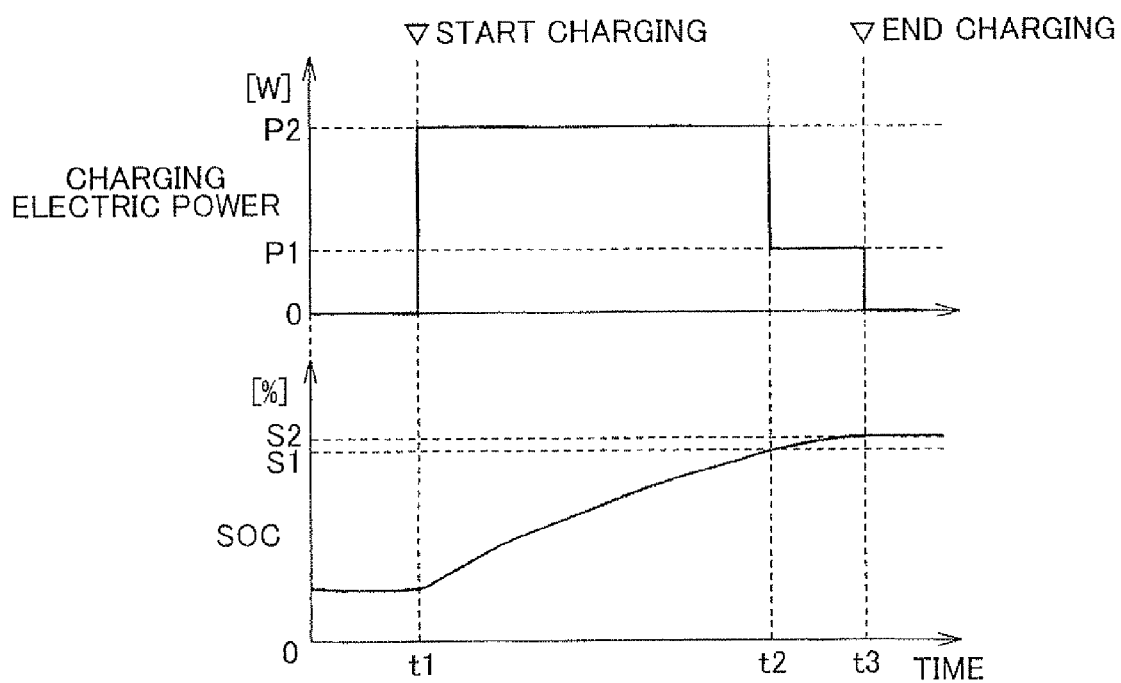
FIG. 8 is a time chart for illustrating an example of the correlation between a state of charge of an electrical storage device and a charging electric power.

FIG. 8 is a time chart that shows an example of the correlation between a state of charge (SOC) of the electrical storage device and a charging electric power. In the example shown in FIG. 8, when charging is started at time t1, the electrical storage device is charged with a relatively large charging electric power P2 in a state where the SOC is low. When the SOC reaches S1 that is slightly lower than S2 that indicates a fully charged state (time t2 in FIG. 8), the charging electric power is decreased from P2 to P1 (P2>P1). By so doing, during a period until the SOC changes from S1 to S2 (between time t2 to time t3 in FIG. 8), the SOC gently increases due to a low charging electric power.

As described above, the SOC of the electrical storage device is computed on the basis of detected values of the current sensor and voltage sensor that are provided at the electrical storage device. It is possible to reduce a charging time when the electrical storage device is charged with a larger charging electric power. However, when the electrical storage device is charged with a large charging electric power, a voltage that is applied to the electrical storage device increases due to the internal resistance of the electrical storage device, so it may lead to deterioration of the electrical storage device or damage to the electrical storage device. Thus, as shown in FIG. 8, in a state close to a fully charged state, by gently charging the electrical storage device with a decreased charging electric power, it is possible to suppress an overvoltage of the electrical storage device. In addition, it is possible to acquire an accurate SOC, so it is possible to accurately determine a fully charged state. Note that a charging electric power may be adjusted by varying a voltage or by varying a current.

In contactless power transfer, as described above, a state where the impedance is matched between a power transmitting side and a power receiving side influences a power transfer efficiency. Therefore, when the impedance varies with the progress of charging operation, the power transfer efficiency may gradually decrease accordingly. Particularly, when the charging electric power is switched as shown in FIG. 8, the impedance of the power receiving side with respect to the power transmitting side further significantly varies before and after changing the charging electric power, so the influence on the power transfer efficiency can also increase.

Figure 9:
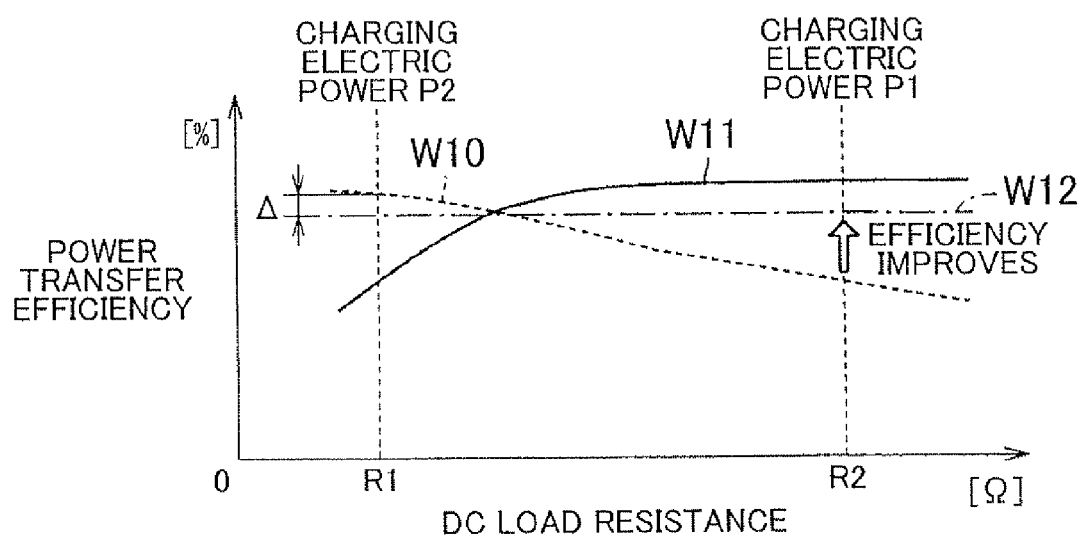
FIG. 9 is a graph for illustrating an example of a variation in power transfer efficiency with a variation in load resistance of a power receiving side.

FIG. 9 is a graph that shows an example of a variation in power transfer efficiency with a variation in load resistance of the power receiving side. In FIG. 9, the abscissa axis represents a load resistance (impedance) of the electrical storage device, and the ordinate axis represents a power transfer efficiency. For the sake of easy understanding, in FIG. 9, the SOC is set in a constant state, so a variation in load resistance is due to a variation in charging electric power.

Generally, the load resistance of the power receiving side is smaller when the charging electric power is large (charging electric power P2 in FIG. 9) than when the charging electric power is small (charging electric power P1 in FIG. 9). When the impedance of the power receiving unit and the impedance of the power transmitting unit are matched in a state of the charging electric power P2 at the time of design, the power transfer efficiency decreases at the time when the charging electric power is decreased to P1 as indicated by a curve W10 in FIG. 9. On the contrary, when the impedances are matched in a state of the charging electric power P1 at the time of design, the power transfer efficiency at the charging electric power P2 decreases as indicated by a curve W11 in FIG. 9.

On the other hand, as described above, by using the DC/DC converter, it is possible to adjust the impedance of the power receiving side. In this case, by appropriately adjusting the DC/DC converter in synchronization with a load fluctuation of the electrical storage device, it is possible to keep the power transfer efficiency substantially constant although there is a loss (Δ) of the DC/DC converter itself as indicated by a curve W12 in FIG. 9.

However, in order to configure the DC/DC converter such that the DC/DC converter is compatible with a widespread load fluctuation as shown in FIG. 9, the DC/DC converter is required to have further high specifications (for example, rated capacity, or the like). This increases the size of the DC/DC converter itself, and also increases cost.

Furthermore, a charging time during which a large charging electric power is used is long, so a decrease in the power transfer efficiency due to a loss (Δ) of the DC/DC converter itself cannot be ignorable.

In the first embodiment, as indicated by the curve W10 shown in FIG. 9, the impedance of the power receiving unit is designed in conformity with a state where the charging electric power is large, and impedance adjustment control is executed such that the DC/DC converter is not used in charging with large electric power and, only when it is switched to a state where the charging electric power is decreased, a decrease in the power transfer efficiency is suppressed with the use of the DC/DC converter.

By so doing, a loss due to usage of the DC/DC converter is suppressed in charging with a large electric power, which is carried out for a relatively long period of time, and the power transfer efficiency is improved with the use of the DC/DC converter in a state where the charging electric power is switched to a small electric power. By so doing, it is possible to improve the power transfer efficiency over all the charging operation.

Furthermore, the DC/DC converter is used only in a specific case where the charging electric power is small, so it is possible to reduce the size of the DC/DC converter as compared with when the DC/DC converter is constantly used, and it is possible to reduce manufacturing cost.

Figure 10:
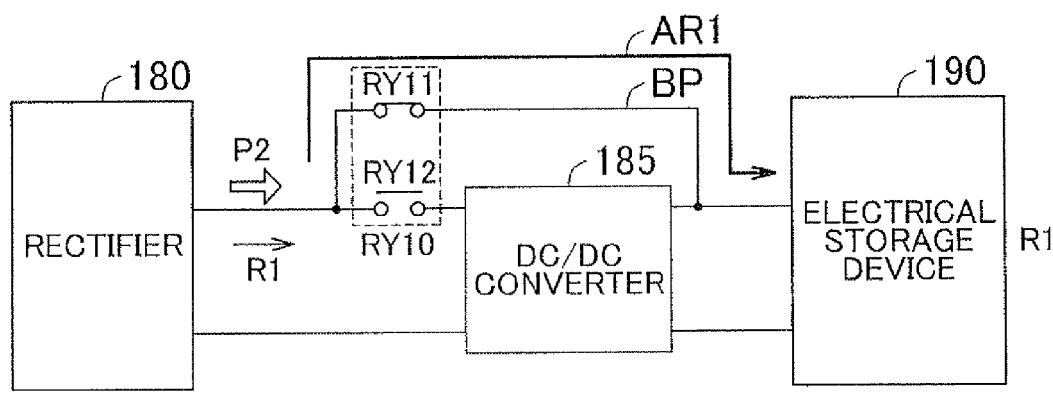
FIG. 10 is a first view for illustrating impedance adjustment control in the first embodiment.

Next, example operation in impedance adjustment control will be described with reference to FIG. 10 and FIG. 11. First, when the charging electric power is large, the bypass line-side relay RY11 of the relay RY10 is closed, and the DC/DC converter 185-side relay RY12 of the relay RY10 is opened, as shown in FIG. 10. By so doing, the charging electric power rectified by the rectifier 180 is transferred to the electrical storage device 190 via the bypass line BP without passing through the DC/DC converter 185 as indicated by an arrow AR1 in FIG. 10. At this time, in order to suppress a switching loss in the DC/DC converter 185, it is desirable to stop switching operation.

Figure 11:
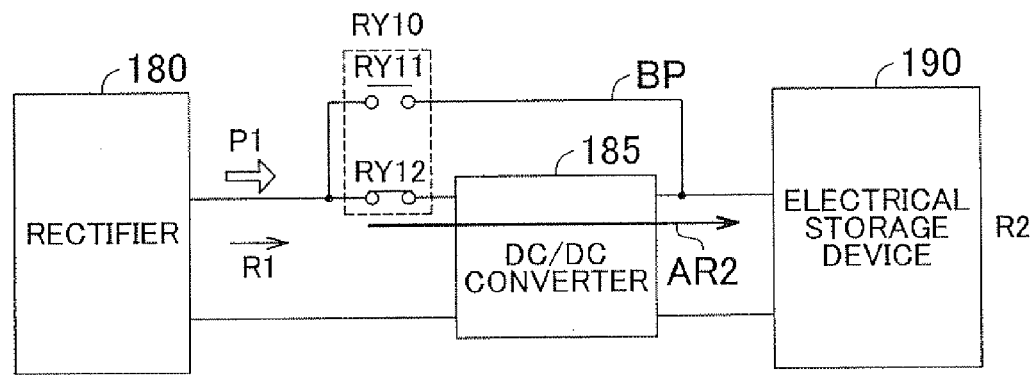
FIG. 11 is a second view for illustrating impedance adjustment control in the first embodiment.

When the charging electric power is decreased, the bypass line-side relay RY11 and the DC/DC converter 185-side relay RY12 are switched, and the DC/DC converter 185 is driven, as shown in FIG. 11. By so doing, the charging electric power is converted in voltage by the DC/DC converter 185, and is then supplied to the electrical storage device 190. By driving the DC/DC converter 185, the actual impedance of the electrical storage device 190 is R2; however, an apparent impedance with respect to the power transmitting device is R1. Therefore, it is possible to maintain the resonance frequency of each of the power transmitting unit of the power transmitting device and the power receiving unit of the vehicle.

Figure 12:
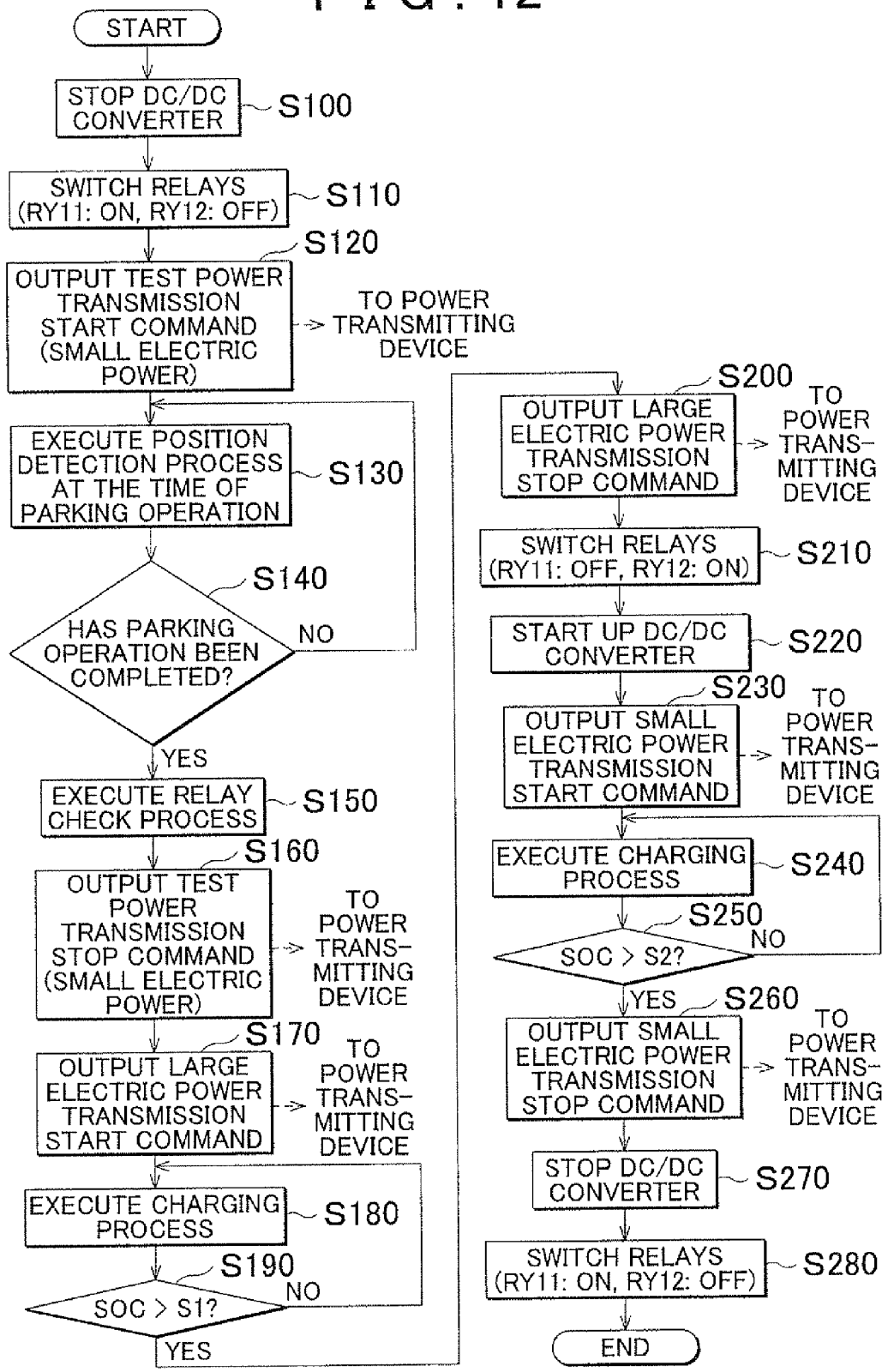
FIG. 12 is a flowchart for illustrating an impedance adjustment control process that is executed by a vehicle ECU in the first embodiment.
Figure 13:
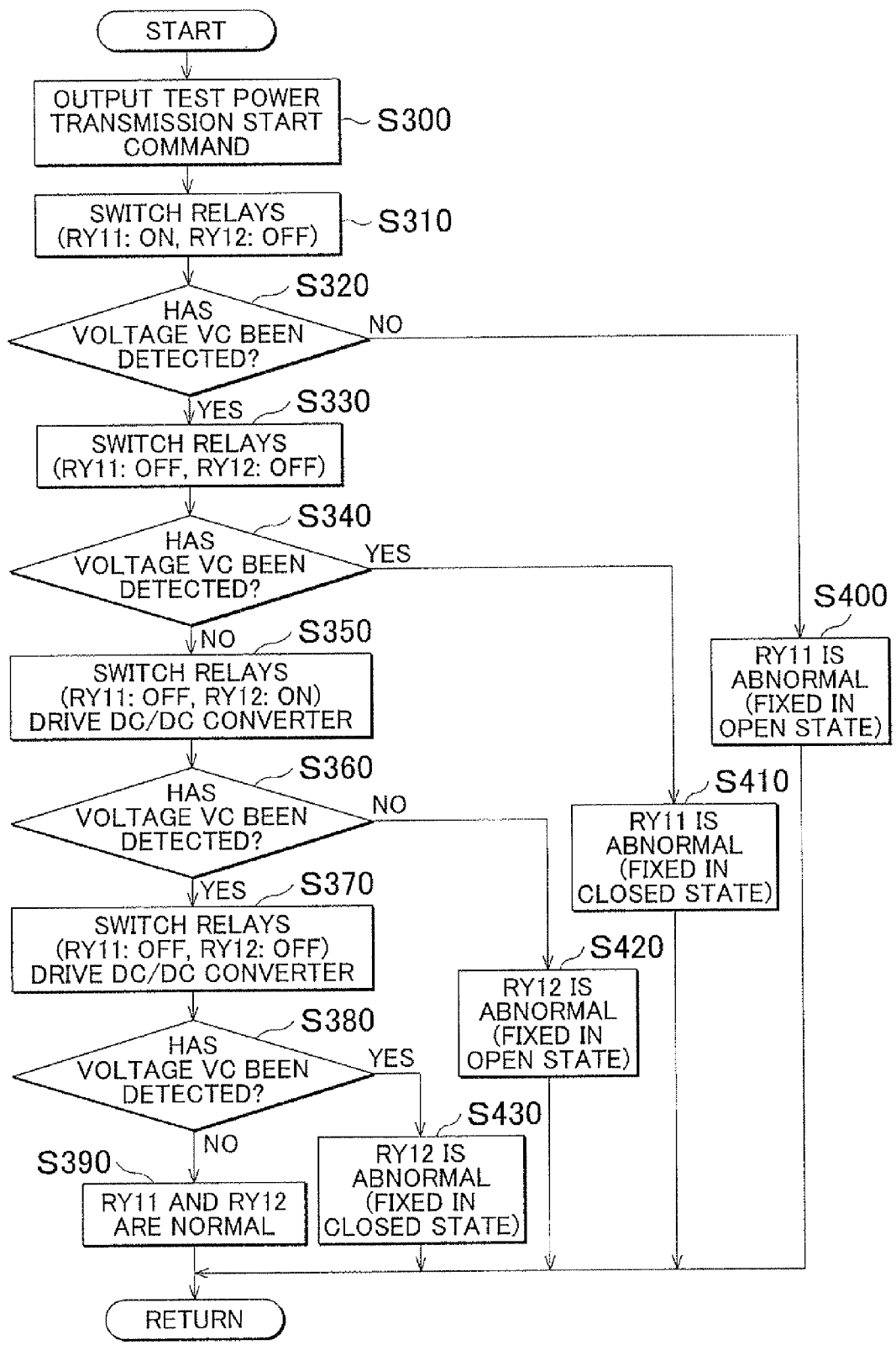
FIG. 13 is a flowchart for illustrating the details of a relay check process in step S150 in FIG. 12.

FIG. 12 is a flowchart for illustrating an impedance adjustment control process that is executed by the vehicle ECU 300 in the first embodiment. Steps in the flowchart in FIG. 12 and steps in the flowchart described later in FIG. 13 are implemented by executing programs prestored in the vehicle ECU 300 and are called from a main routine at predetermined intervals or in response to fulfillment of a predetermined condition. Alternatively, for part of steps, the processes may be implemented by constructing exclusive hardware (electronic circuit).

As shown in FIG. 2 and FIG. 12, when a user instructs the vehicle ECU 300 to charge the electrical storage device 190 through contactless power supply, the vehicle ECU 300 initially executes guidance process for positioning the vehicle 100 at a charging position at which the power transmitting unit 220 is present. Note that, when charging instructions are issued after the user has completed parking the vehicle 100 at a parking position, the processes of steps (hereinafter, step is abbreviated as "S") 100 to 140 described below may be skipped.

The vehicle ECU 300 stops the DC/DC converter 185 in S100, and closes the relay RY11 in the relay RY10 and opens the relay RY12 in the relay RY10 in S110. In this guidance process, a small electric power smaller than that during normal charging is used as described in S120, so the power transfer path is switched to the bypass line BP so that the influence of a loss due to the DC/DC converter 185 is reduced.

The vehicle ECU 300 outputs a command to start test transmission of electric power to the power transmitting device 200 in S120. In response to this, a small electric power is output from the power transmitting device 200.

After that, the vehicle ECU 300 executes a position detection process at the time of parking operation in S130 while the user is conducting parking operation. As described with reference to FIG. 6, and the like, the power transfer efficiency varies with a distance between the power transmitting unit 220 and the power receiving unit 110. Therefore, the vehicle ECU 300 determines whether the parking position of the vehicle 100 is appropriate on the basis of the power transfer efficiency of electric power that is transferred in test transmission of electric power. Specifically, the vehicle ECU 300 determines that the parking position is appropriate when the power transfer efficiency exceeds a predetermined threshold.

The vehicle ECU 300 notifies a positioning state to the user by, for example, indicating the positioning state on a navigation screen (not shown), or the like. The user adjusts the parking position on the basis of the notified positioning state.

When the vehicle 100 has the function of automatically executing parking operation, parking control may be executed on the basis of the positioning state that is determined by the vehicle ECU 300.

Subsequently, in S140, the vehicle ECU 300 determines whether parking operation has been completed. Specifically, the vehicle ECU 300, for example, determines whether parking operation has been completed on the basis of user's parking completion operation, such as operation of a parking brake and input of a parking completion signal. When automatic parking control is executed, it may be determined on the basis of completion of parking control.

When parking operation has not been completed (NO in S140), the process returns to S130, and the vehicle ECU 300 continues the position detection process until parking operation is completed.

When parking operation has been completed (YES in S140), the process proceeds to S150, and the vehicle ECU 300 subsequently executes a relay check process for checking an abnormality in contacts of the relay RY10. The details of the relay check process will be described later with reference to FIG. 13.

When there is no abnormality in the relay RY10 in the relay check process, the process proceeds to S160, and the vehicle ECU 300 outputs a command to stop test transmission of electric power to the power transmitting device 200. In S170, the vehicle ECU 300 outputs a power transmission start command to transmit large electric power for executing actual charging operation to the power transmitting device 200. In response to this, the power transmitting device 200 stops transmitting small electric power, and starts power transmitting operation using a large electric power. Although not shown in FIG. 12, when an abnormality of the relay RY10 has been detected in the relay check process, the vehicle ECU 300 provides an abnormality notification to the user, skips the following processes and ends the process.

In S180, the vehicle ECU 300 executes a charging process for charging the electrical storage device 190. In S190, the vehicle ECU 300 determines whether the SOC of the electrical storage device 190 becomes larger than the threshold S1 as described in FIG. 8 (S190).

When the SOC is lower than or equal to the threshold S1 (NO in S190), the process returns to S180, and the charging process is continued.

When the SOC exceeds the threshold S1 (YES in S190), the process proceeds to S200, and the vehicle ECU 300 outputs a command to stop transmitting large electric power to the power transmitting device 200.

In S190, instead of the SOC, it is possible to use a comparison between the power transfer efficiency and a predetermined threshold. In this case, when the power transfer efficiency is higher than or equal to the threshold, the process returns to S180, and the charging process is continued; whereas, when the power transfer efficiency is lower than the threshold, the process proceeds to S200.

When transmission of electric power from the power transmitting device 200 is stopped, the vehicle ECU 300 switches the relay RY10 to open the RY11 and close the RY12 in S210. Then, the vehicle ECU 300 starts up the DC/DC converter 185.

After that, in S220, the vehicle ECU 300 outputs a command to start transmitting small electric power to the power transmitting device 200. In response to the start command, transmission of small electric power from the power transmitting device 200 is carried out.

In S240, the vehicle ECU 300 further executes the charging process while bringing the apparent impedance of the electrical storage device 190 with respect to the power transmitting device 200 to the same level as in the case of transmission of large electric power by controlling the DC/DC converter 185. In S250, the vehicle ECU 300 determines whether the SOC of the electrical storage device 190 exceeds the threshold S2 that indicates a fully charged state.

When the SOC is lower than or equal to the threshold S2 (NO in S250), the process returns to S240, and the vehicle ECU 300 continues transmission of small electric power until the electrical storage device 190 becomes a fully charged state.

When the SOC exceeds the threshold S2 (YES in S250), the vehicle ECU 300 determines that charging of the electrical storage device 190 has been completed, and outputs a power transmission stop command to stop transmitting electric power to the power transmitting device 200 (S260).

When transmission of electric power from the power transmitting device 200 is stopped in response to the power transmission stop command, the vehicle ECU 300 stops the DC/DC converter 185 (S270), and switches the relay RY10 to close the relay RY11 and open the relay RY12 (S280). At this time, both the RY11 and the RY12 may be opened.

Next, the details of the relay check process in S150 in FIG. 12 will be described with reference to FIG. 13. As shown in FIG. 2 and FIG. 13, when the relay check process is started, the vehicle ECU 300 initially outputs a command to start test transmission of small electric power to the power transmitting device 200 in S300. When the power transmission start command has been already transmitted, the process of S300 is skipped.

In S310, the vehicle ECU 300 outputs the control signal SE3 such that the relay RY11 in the relay RY10 is closed and the relay RY12 in the relay RY10 is opened, and selects the bypass line BP-side power path. In S320, the vehicle ECU 300 determines whether the voltage VC has been detected by the voltage sensor included in the voltage detecting unit 186.

When the relay RY11 is in a closed state in accordance with the command of the control signal SE3, the voltage VC should be detected in the voltage detecting unit 186. Therefore, when the voltage VC has not been detected (NO in S320), the process proceeds to S400, and the vehicle ECU 300 determines that there is an abnormality that the relay RY11 remains in an open state, and proceeds with the process to S160 in FIG. 12.

When the voltage VC has been detected (YES in S320), the process proceeds to S330, and the vehicle ECU 300 outputs, to the relay RY10, the control signal SE3 for opening both the relays RY11 and RY12, and determines in S340 whether the voltage VC has been detected in the voltage detecting unit 186.

In this state, when the relay RY11 is in an open state in accordance with the command of the control signal SE3, the voltage VC should not be detected in the voltage detecting unit 186. Therefore, when the voltage VC has been detected (YES in S340), the process proceeds to S410, and the vehicle ECU 300 determines that there is an abnormality that the relay RY11 remains in a closed state, and proceeds with the process to S160 in FIG. 12.

When the voltage VC has not been detected (NO in S340), the process proceeds to S350, and the vehicle ECU 300 outputs, to the relay RY10, the control signal SE3 for closing the relay RY12 while keeping the relay RY11 open, and starts up the DC/DC converter 185.

In this state, the relay RY11 is normal, so, when the relay RY12 is in a closed state in accordance with the command of the control signal SE3, the DC/DC converter 185 is driven and, as a result, the voltage VC should be detected in the voltage detecting unit 186. Therefore, when the voltage VC has not been detected (NO in S360), the process proceeds to S420, and the vehicle ECU 300 determines that there is an abnormality that the relay RY12 remains in an open state, and proceeds with the process to S160 in FIG. 12.

When the voltage VC has been detected (YES in S360), the process proceeds to S370, and the vehicle ECU 300 outputs, to the relay RY10, the control signal SE3 for opening both the relays RY11 and RY12 in a state where the DC/DC converter 185 is driven.

In this state, when the relay RY12 is in an open state in accordance with the command of the control signal SE3, the voltage VC should not be detected in the voltage detecting unit 186. Therefore, when the voltage VC has been detected (YES in S380), the process proceeds to S430, and the vehicle ECU 300 determines that there is an abnormality that the relay RY12 remains in a closed state, and proceeds with the process to S160 in FIG. 12.

When the voltage VC has not been detected (NO in S380), the process proceeds to S390, and the vehicle ECU 300 determines that both the relays RY11 and RY12 are normal.

When the DC/DC converter is of an non-insulated type, the DC/DC converter is in an energized state even when the DC/DC converter is not driven, so, when the voltage VC has been detected in S340, it may be determined that there is an abnormality that the relay RY11 or the relay RY12 remains in a closed state.

In the flowchart shown in FIG. 13, the description is made on the example in which it is determined whether there is an abnormality in the relays on the basis of a variation in voltage due to switching of the relays. It may be determined whether there is an abnormality in the relays on the basis of a variation in current flowing through the circuit or power factor instead of or in addition to the voltage. Not only determination before start of charging, but also, when the power transfer efficiency is further lower than the fluctuation range of the power transfer efficiency, which can be assumed in normal charging operation, while charging operation is being carried out, or when the power transfer efficiency significantly decreases, it may be determined that it is highly likely that there is an abnormality in the relays and then charging operation may be stopped.

By executing control in accordance with the process shown in FIG. 12 and FIG. 13, it is possible to improve the power transfer efficiency by preventing a decrease in power transfer efficiency due to a load fluctuation of the electrical storage device in the contactless power supply system.

Figure 14:
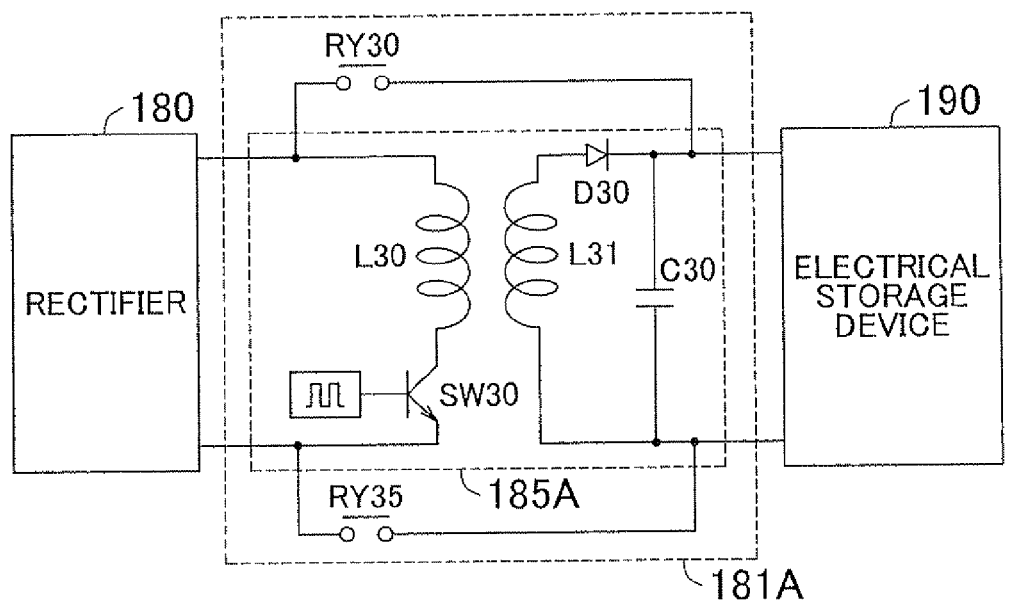
FIG. 14 is a detailed view that shows another example of a DC/DC converter.
Figure 15:
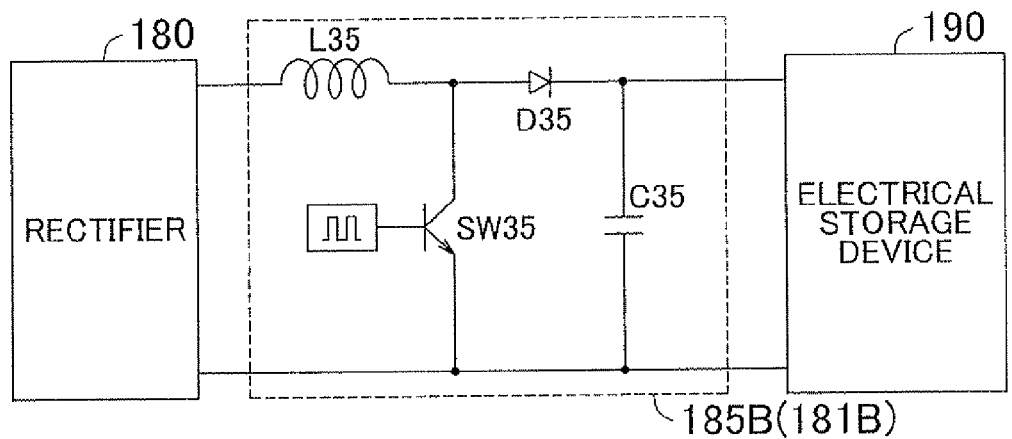
FIG. 15 is a detailed view that shows another example of a DC/DC converter.

The configuration of the relay RY10 and DC/DC converter 185 may be, for example, constructed as shown in FIG. 14 or FIG. 15, other than the configuration shown in FIG. 2.

An impedance adjustment unit 181A shown in FIG. 14 includes a DC/DC converter 185A and relays RY30 and RY35. The DC/DC converter 185A is an insulated converter that includes a transformer having a primary coil L30 and a secondary coil L31. A switching element SW30 is serially connected to the primary coil L30. A desired voltage is obtained by controlling the duty of the switching element SW30. Electric power received by the secondary coil L31 is rectified with the use of a diode D30 and smoothed with the use of a capacitor C30, and is then supplied to the electrical storage device 190.

In the thus configured DC/DC converter 185A, when the switching element SW30 is turned off, current does not flow through the primary coil L30, so electric power is not supplied to the secondary coil L31. That is, the switching element SW30 can function as the relay R12 of the relay RY10 in FIG. 2. Therefore, by providing the relays RY30 and RY35, which correspond to the relay RY11 for switching between selection and non-selection of the bypass line BP, it is possible to implement the function as in the case of the relay RY10 in FIG. 2.

FIG. 15 shows an example in which a non-insulated-type DC/DC converter 185B is provided as an impedance adjustment unit 181B. The non-insulated-type DC/DC converter 185B is formed of a copper circuit that includes a reactor L35, a switching element SW35 and a diode D35.

In the DC/DC converter 185B shown in FIG. 15, when the switching element SW35 is turned off, direct-current power that is supplied from the rectifier 180 is directly supplied to the electrical storage device 190. That is, this corresponds to power transfer in the case where the bypass line BP is used in FIG. 2. On the other hand, when the switching element SW35 is subjected to duty control, direct-current power from the rectifier 180 is stepped up and is then supplied to the electrical storage device 190.

In the example of FIG. 15, a bypass state and a step-up state are switched in a state where the switching element SW35 is driven, so it is possible to omit the additional relay RY10 shown in FIG. 2.

Figure 16:
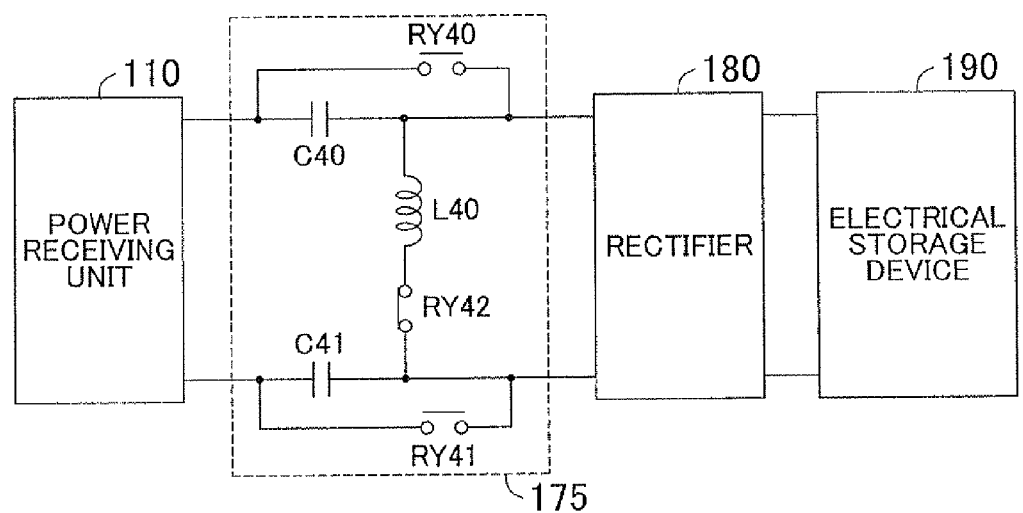
FIG. 16 is a view that shows an example in the case where a matching transformer is used as an impedance adjustment unit.

In the above-described example, the impedance adjustment unit is provided in the path of direct-current power downstream of the rectifier 180. Instead, as shown in an example of FIG. 16, a matching transformer 175 may be provided in the path of alternating-current power upstream of the rectifier 180 as an impedance adjustment unit 181B.

The matching transformer 175 includes a relay RY42, a reactor L40, capacitors C40 and C41, and relays RY40 and RY41. The relay RY42 and the reactor L40 are serially connected to each other between two power lines between the power receiving unit 110 and the rectifier 180. The capacitors C40 and C41 are respectively provided in those power lines. The relays RY40 and RY41 are respectively connected to the capacitors C40 and C41.

When impedance adjustment is not carried out, the relays RY40 and RY41 are closed, and the relay RY42 is opened. On the other hand, when impedance adjustment is carried out, the relays RY40 and RY41 are opened, and the relay RY42 is closed. The matching transformer 175 is just one example. As long as it is possible to carry out desired impedance adjustment, it is possible to provide any configuration other than that of FIG. 16.

Next, a second embodiment will be described. In the above-described first embodiment, the description is made on the case where an impedance fluctuation of the electrical storage device as a result of switching of charging electric power or a variation in the state of charge of the electrical storage device is adjusted with the use of the vehicle-side impedance adjustment unit (DC/DC converter, matching transformer).

Incidentally, while charging operation is being carried out, a distance between a vehicle and a ground surface can fluctuate, for example, when an occupant gets on or off the vehicle or when baggage is loaded onto or unloaded from the vehicle. Then, as described with reference to FIG. 4, FIG. 5, and the like, the power transfer efficiency can be influenced by a variation in impedance between a power transmitting unit and a power receiving unit.

In the second embodiment, description will be made on the case where an impedance variation due to such a positional deviation between a power transmitting unit and a power receiving unit is adjusted at a power transmitting device side.

Figure 17:
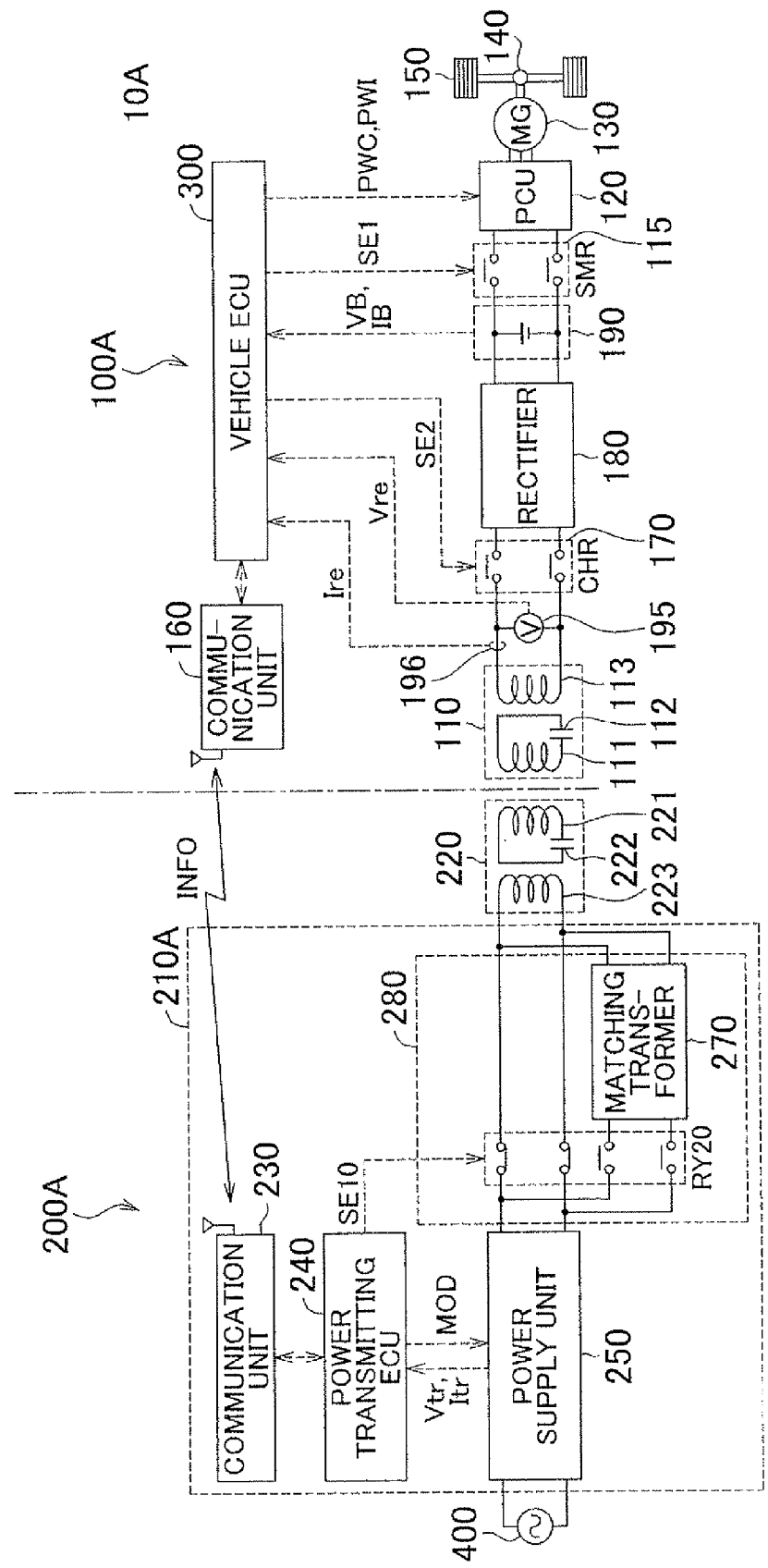
FIG. 17 is a functional block diagram that illustrates the detailed configuration of a vehicle and a power transmitting device in a second embodiment.

FIG. 17 is a functional block diagram that illustrates the detailed configuration of a vehicle 100A and power transmitting device 200A in a vehicle power supply system 10A according to the second embodiment. In FIG. 17, instead of the impedance adjustment unit 181 (the relay RY10, and the DC/DC converter 185) and the voltage detecting unit 186 at the vehicle 100 in the vehicle power supply system 10 shown in FIG. 2 according to the first embodiment, an impedance adjustment unit 280 that includes a relay RY20 and a matching transformer 270 is provided in a power supply device 210A at a power transmitting device 200A. In FIG. 17, the description of components that overlap with the components of FIG. 2 is not repeated.

The matching transformer 270 is connected in parallel with a power path that connects the power supply unit 250 to the power transmitting unit 220. The matching transformer 270 is, for example, formed to include a reactor and a capacitor, and, is able to adjust the impedance of the power transmitting unit 220.

The relay RY20 is controlled by a control signal SE10 from the power transmitting ECU 240, and is configured to be able to switch between a first power path and a second power path. The first power path electrically directly connects the power supply unit 250 to the power transmitting unit 220. The second power path electrically connects the power supply unit 250 to the power transmitting unit 220 via the matching transformer 270.

The power transmitting ECU 240 computes a power transfer efficiency on the basis of an electric power received from the vehicle 100A. The power transmitting ECU 240 switches the relay RY20 on the basis of the computed power transfer efficiency. The power transfer efficiency may be computed on the basis of a reflected power that is detectable at the power transmitting device 200A. Alternatively, the relay RY20 may be switched on the basis of a difference between an output electric power command value from the vehicle 100A and an actual output electric power.

It is applicable that the vehicle ECU 300 computes a power transfer efficiency from transmitted electric power information transmitted from the power transmitting ECU 240 via the communication unit and received electric power information at the vehicle and then the power transmitting ECU 240 switches the relay RY20 in accordance with a command transmitted from the vehicle ECU 300.

For example, as shown in FIG. 18, when the impedance is adjusted in a state where the matching transformer 270 is not used at a design optimal position at which there is no positional deviation between the power transmitting unit 220 and the power receiving unit 110, until the power transfer efficiency decreases to a predetermined allowable value α, and the relay RY20 is switched such that electric power is transferred by the above-described first power path without using the matching transformer 270. On the other hand, when the power transfer efficiency becomes lower than the allowable value α (A1 in FIG. 18) due to a positional deviation between the power transmitting unit 220 and the power receiving unit 110, the RY20 is switched such that electric power is transferred by the second power path using the matching transformer 270. In this case, the matching transformer 270 is set so as to compensate for a deviation in impedance at the time when the power transfer efficiency becomes lower than the allowable value.

In FIG. 17, the description is made on the example in which the case where the matching transformer is used and the case where the matching transformer is not used are switched.

Figure 19:
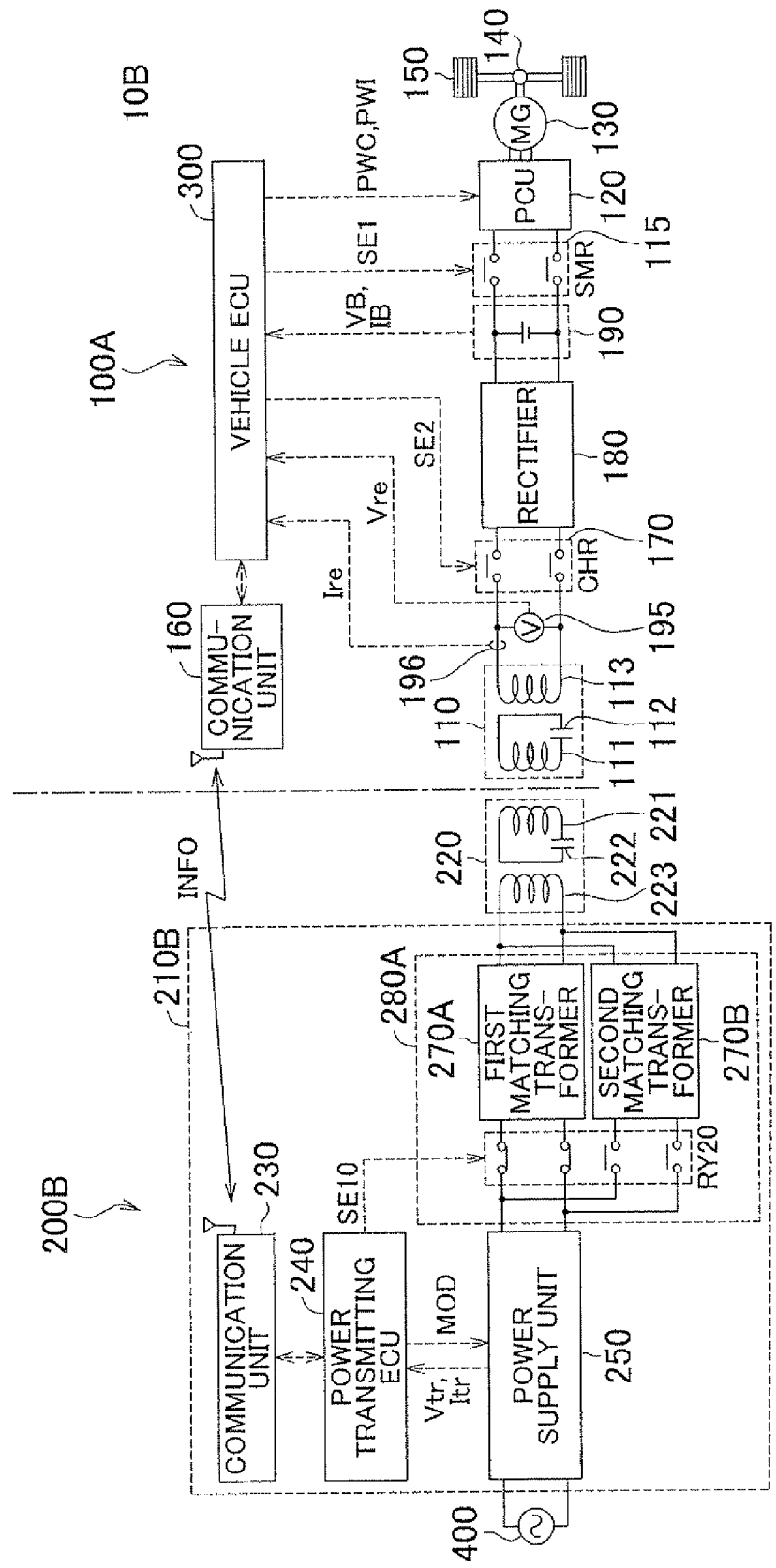
FIG. 19 is a functional block diagram for illustrating another example of the configuration of a vehicle and a power transmitting device in the second embodiment.

Instead, as shown in FIG. 19 that shows another example of the configuration of the vehicle and power transmitting device in the second embodiment, two different matching transformers 270A and 270B may be switched on the basis of a power transfer efficiency (that is, a positional deviation between the power transmitting unit and the power receiving unit). In addition, more than two power paths may be switched.

Figure 20A:
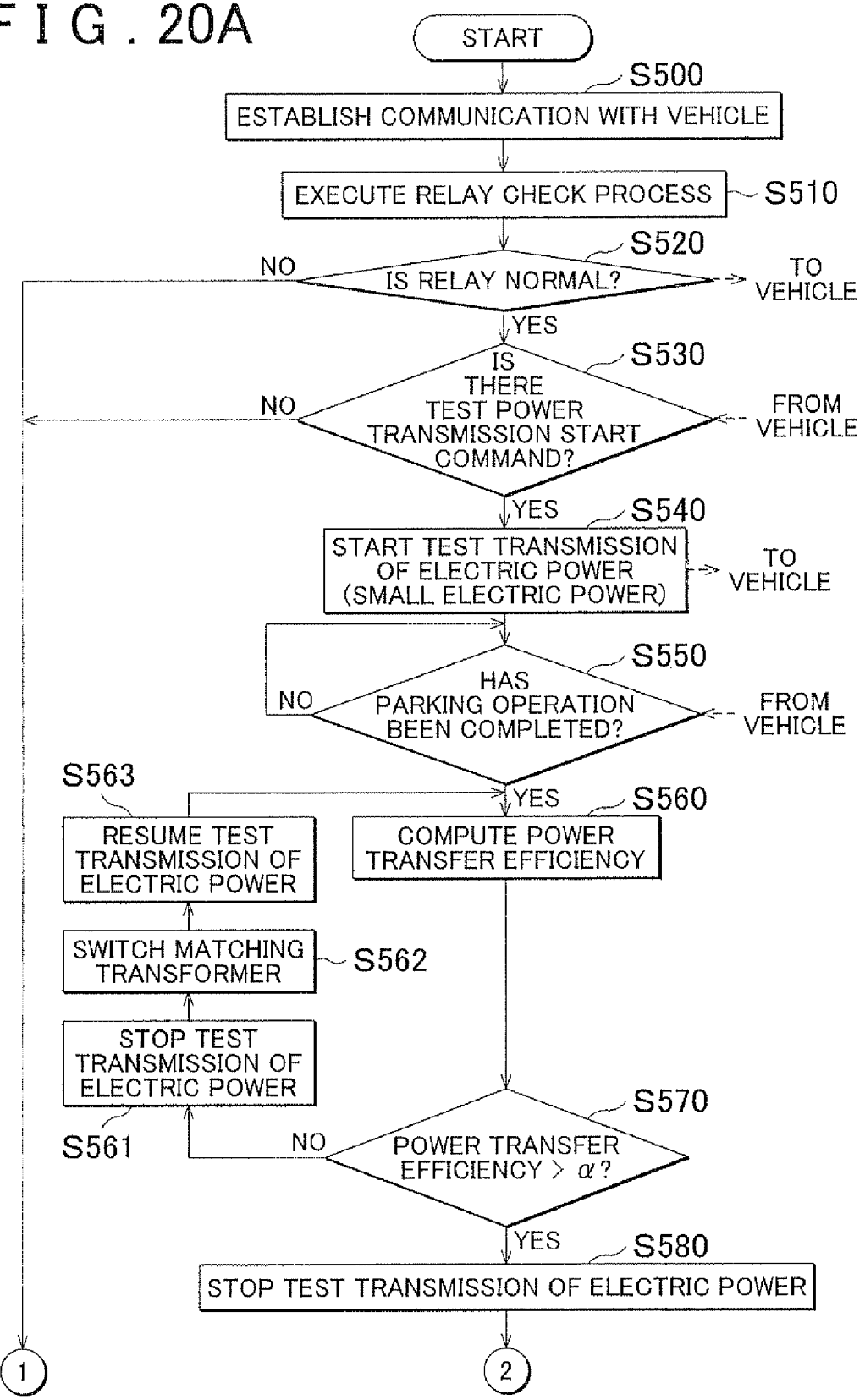
FIGS. 20A and 20B are flowcharts for illustrating an impedance adjustment control process that is executed in a power transmitting ECU in the second embodiment.
Figure 20B:
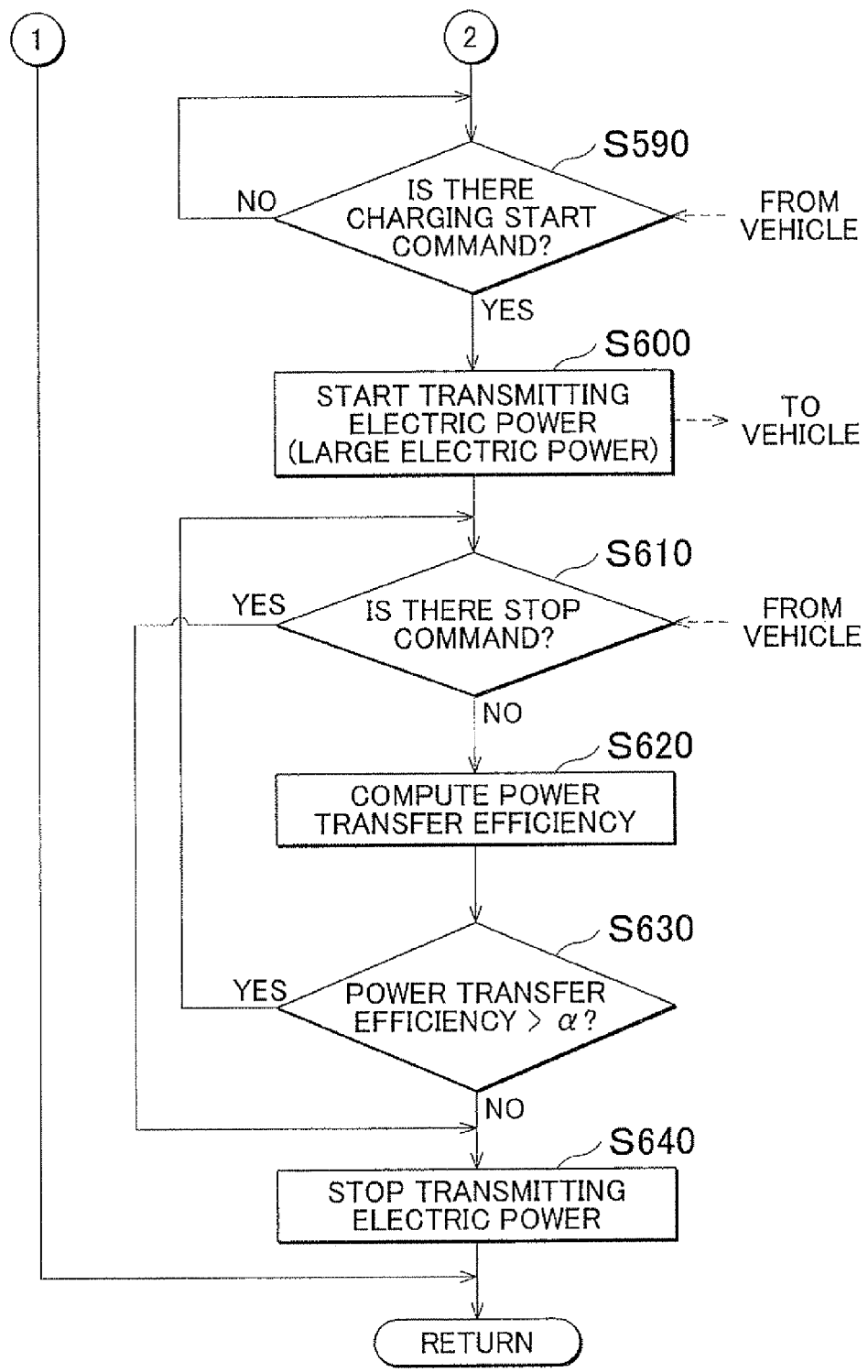

FIGS. 20A and 20B are flowcharts for illustrating an impedance adjustment control process that is executed by the power transmitting ECU 240 in the second embodiment. Steps in the flowchart in FIGS. 20A and 20B are implemented by executing programs prestored in the power transmitting ECU 240 and are called from a main routine at predetermined intervals or in response to fulfillment of a predetermined condition. Alternatively, for part of steps, the processes may be implemented by constructing exclusive hardware (electronic circuit).

As shown in FIG. 17 and FIGS. 20A, 20B, when the power transmitting ECU 240 establishes communication with the vehicle 100A in S500, the power transmitting ECU 240 executes the relay check process for detecting whether there is a failure in the relays included in the relay RY20 in S510. In S510, the power transmitting ECU 240 also checks for an abnormality in a vehicle-side charging system from information that is transmitted from the vehicle 100A.

Although the details of the relay check process are not shown in FIGS. 20A and 20B, it may be determined whether there is an abnormality on the basis of a variation in voltage, current, or the like, in the case where the relay RY20 is switched while test transmission of electric power is being carried out, as in the case of the first embodiment. The relay check process may be periodically executed in the power transmitting device irrespective of whether communication with the vehicle is established.

In S520, the power transmitting ECU 240 determines whether the relay RY20 is normal in the relay check process. When the relay RY20 is abnormal (NO in S520), the following process is skipped, and power transmitting operation of the vehicle 100A is prohibited. When the relay RY20 is normal (YES in S520), the process proceeds to S530. The result determined in S520 is transmitted to the vehicle 100A by the communication unit 230.

When the relay RY20 is normal, the power transmitting ECU 240 determines in S530 whether a test power transmission start command for parking operation guidance has been received from the vehicle 100A. When the test power transmission start command has not been received (NO in S530), the following process is skipped. When the test power transmission start command has been received (YES in S530), the process proceeds to S540, and the power transmitting ECU 240 starts test transmission of small electric power.

In S550, the power transmitting ECU 240 determines whether user's parking operation has been completed on the basis of information from the vehicle 100A.

When parking operation has not been completed (NO in S550), the process returns to S550, and test transmission of electric power is continued until parking operation is completed. When parking operation has been completed (YES in S550), the process proceeds to S560, and a power transfer efficiency is computed using, for example, information about a received electric power from the vehicle and/or a reflected power that is detected by the power transmitting device 200A, and it is determined in S570 whether the computed power transfer efficiency is higher than the predetermined allowable value α.

When the power transfer efficiency is lower than or equal to the allowable value α (NO in S570), the process proceeds to S561, and test transmission of electric power is temporarily stopped. In S562, the power transmitting ECU 240 controls the RY20 to switch the power path. After that, the power transmitting ECU 240 resumes test transmission of electric power in S563, and computes a power transfer efficiency again in S560. After that, it is determined in S570 again whether the power transfer efficiency is higher than the predetermined allowable value α.

When the power transfer efficiency is higher than the allowable value α (YES in S570), power transmission of the vehicle 100A is allowed, and the process proceeds to S580.

The power transmitting ECU 240 stops test transmission of electric power in S580. In S590, the power transmitting ECU 240 determines whether a charging start command has been received from the vehicle 100A.

When the charging start command has not been received (NO in S590), the process returns to S590, and the power transmitting ECU 240 waits for reception of the charging start command from the vehicle 100A.

When the charging start command has been received (YES in S590), the process proceeds to S600, and the power transmitting ECU 240 starts transmitting large electric power to the vehicle 100A. In response to this, the vehicle 100A charges the electrical storage device 190.

In S610, the power transmitting ECU 240 determines whether a power transmission stop command has been received from the vehicle 100A while power transmitting operation is being carried out. The power transmission stop command is output from the vehicle 100A, for example, when charging of the electrical storage device 190 has been completed, when charging has been forcibly stopped by the user before completion of charging or when there occurs an abnormality at the vehicle 100A.

When the power transmission stop command has been received (YES in S610), the process proceeds to S640, and the power transmitting ECU 240 stops power transmitting operation to the vehicle 100A.

On the other hand, when the power transmission stop command has not been received (NO in S610), the process proceeds to S620, and the power transmitting ECU 240 computes a power transfer efficiency during transmission of electric power, and determines whether the computed power transfer efficiency is higher than the allowable value α (S630).

When the power transfer efficiency is higher than the allowable value α (YES in S630), the process returns to S610, and the power transmitting ECU 240 continues power transmitting operation. When the power transfer efficiency is lower than or equal to the allowable value α (NO in S630), the process proceeds to S640, and the power transmitting ECU 240 stops power transmitting operation to the vehicle 100A and ends the process. When power transmitting operation is stopped because the power transfer efficiency is lower than or equal to the allowable value α, the matching transformer is switched through test transmission of electric power in S560 to S580, and S561 to S563, and charging is resumed after being adjusted to a state where the power transfer efficiency is higher than the allowable value α.

Although not shown in FIGS. 20A and 20B, when any of power transfer efficiencies for respective switchable matching transformers is lower than or equal to the allowable value α in S570, transmission of electric power to the vehicle 100A may be prohibited. Alternatively, when transmission of electric power to the vehicle 100A is allowed by instructions from the user even with a decreased power transfer efficiency, the process proceeds to S580, and electric power is transmitted to the vehicle 100A. In this case, the allowable value in S630 is also changed.

By executing control in accordance with the above-described process, it is possible to prevent a decrease in power transfer efficiency due to a variation in distance (positional deviation) between the power transmitting unit and the power receiving unit with the use of the impedance adjustment unit at the power transmitting device.

A configuration that combines the first embodiment with the second embodiment, that is, a configuration that the impedance adjustment unit is provided at each of both the power transmitting device and the vehicle, is also possible.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle comprising:
   a power receiving unit configured to contactlessly receive electric power from a power transmitting device;
   an electrical storage device configured to store electric power received by the power receiving unit; and
   an impedance adjustment unit electrically connected between the power receiving unit and the electrical storage device, the impedance adjustment unit being configured to adjust an impedance between the power receiving unit and the electrical storage device, the impedance adjustment unit being configured to switch an adjusted state of the impedance between a first adjusted state and a second adjusted state on the basis of a power transfer state from the power transmitting device to the power receiving unit, and electric power received by the power receiving unit in the first adjusted state being supplied to the electrical storage device in a state where the impedance is not adjusted, wherein
   the power transmitting device includes a power transmitting unit configured to contactlessly supply electric power, and
   a coupling coefficient between the power transmitting unit and the power receiving unit is smaller than or equal to 0.1.

2. The vehicle according to claim 1, further comprising:
   a control unit configured to control the impedance adjustment unit, the control unit being configured to switch between the first adjusted state and the second adjusted state on the basis of a magnitude of a charging electric power supplied to the electrical storage device.

3. The vehicle according to claim 2, wherein
   the control unit is configured to charge the electrical storage device with a first charging electric power or a second charging electric power on the basis of a state of charge of the electrical storage device, the second charging electric power being smaller than the first charging electric power, and
   the control unit is configured to switch the impedance adjustment unit to the first adjusted state when the first charging electric power is used and to switch the impedance adjustment unit to the second adjusted state when the second charging electric power is used.

4. The vehicle according to claim 1, further comprising:
   a control unit configured to control the impedance adjustment unit, the control unit being configured to switch between the first adjusted state and the second adjusted state on the basis of a power transfer efficiency between the power transmitting device and the power receiving unit.

5. The vehicle according to claim 4, wherein
   the control unit is configured to, when the power transfer efficiency becomes lower than a predetermined threshold at the time when electric power is being transferred in the first adjusted state, switch the impedance adjustment unit from the first adjusted state to the second adjusted state.

6. The vehicle according to claim 1, further comprising:
   a rectifying unit configured to rectify electric power received by the power receiving unit, wherein
   the impedance adjustment unit includes a DC/DC converter configured to convert a voltage from the rectifying unit and configured to supply the converted voltage to the electrical storage device.

7. The vehicle according to claim 1, further comprising:
   a rectifying unit configured to rectify electric power received by the power receiving unit, wherein
   the impedance adjustment unit includes a matching transformer provided between the power receiving unit and the rectifying unit, the matching transformer being configured to include at least one of a coil and a capacitor.

8. The vehicle according to claim 1, wherein
   the impedance adjustment unit includes a switching unit configured to switch between the first adjusted state and the second adjusted state.

9. The vehicle according to claim 8, further comprising:
   a control unit configured to control the switching unit, the control unit being configured to determine whether there is an abnormality in the switching unit on the basis of a state of electric power supplied to the electrical storage device and a state of switching of the switching unit.

10. The vehicle according to claim 1, wherein
    a difference between a natural frequency of the power transmitting unit and a natural frequency of the power receiving unit is smaller than or equal to ±10% of one of the natural frequency of the power transmitting unit and the natural frequency of the power receiving unit.

11. The vehicle according to claim 1, wherein
    the power receiving unit is configured to receive electric power from the power transmitting unit through at least one of a magnetic field and an electric field, the magnetic field being formed between the power receiving unit and the power transmitting unit, the magnetic field oscillating at a predetermined frequency, the electric field being formed between the power receiving unit and the power transmitting unit, and the electric field oscillating at a predetermined frequency.

12. A contactless power supply system that contactlessly supplies electric power, comprising:
    a vehicle; and
    a power transmitting device that includes: a power supply unit, a power transmitting unit and a first impedance adjustment unit, the power transmitting unit being configured to contactlessly supply electric power to the vehicle, the electric power being supplied from the power supply unit; the first impedance adjustment unit being electrically connected between the power supply unit and the power transmitting unit, and the first impedance adjustment unit being configured to adjust an impedance between the power supply unit and the power transmitting unit, the first impedance adjustment unit being configured to switch an adjusted state of the impedance between a first adjusted state and a second adjusted state on the basis of a power transfer state from the power transmitting device to the vehicle, electric power from the power supply unit in the first adjusted state being supplied to the power transmitting unit in a state where the impedance is not adjusted, the vehicle including: a power receiving unit, an electrical storage device and a second impedance adjustment unit, the power receiving unit being configured to contactlessly receive electric power from the power transmitting unit, the electrical storage device being configured to store electric power received by the power receiving unit, the second impedance adjustment unit being electrically connected between the power receiving unit and the electrical storage device, the second impedance adjustment unit being configured to adjust an impedance between the power receiving unit and the electrical storage device, the second impedance adjustment unit being configured to switch an adjusted state of the impedance between a third adjusted state and a fourth adjusted state on the basis of the power transfer state from the power transmitting device to the vehicle, electric power received by the power receiving unit in the third adjusted state being supplied to the electrical storage device in a state where the impedance is not adjusted, wherein a coupling coefficient between the power transmitting unit and the power receiving unit is smaller than or equal to 0.1.

13. The contactless power supply system according to claim 12, further comprising:

a control unit configured to control the first and second impedance adjustment units, the control unit being configured to adjust a mismatch of the impedance due to a positional deviation between the power transmitting unit and the power receiving unit with the use of the first impedance adjustment unit, and the control unit being configured to adjust a mismatch of the impedance due to a load fluctuation during charging of the electrical storage device with the use of the second impedance adjustment unit.

14. A vehicle comprising:

a power receiving unit configured to contactlessly receive electric power from a power transmitting device;

an electrical storage device configured to store electric power received by the power receiving unit;

an impedance adjustment unit electrically connected between the power receiving unit and the electrical storage device, the impedance adjustment unit being configured to adjust an impedance between the power receiving unit and the electrical storage device, the impedance adjustment unit being configured to switch an adjusted state of the impedance between a first adjusted state and a second adjusted state on the basis of a power transfer state from the power transmitting device to the power receiving unit, and electric power received by the power receiving unit in the first adjusted state being supplied to the electrical storage device in a state where the impedance is not adjusted; and a control unit configured to control the impedance adjustment unit, the control unit being configured to switch between the first adjusted state and the second adjusted state on the basis of a power transfer efficiency between the power transmitting device and the power receiving unit.

15. The vehicle according to claim 14, wherein the control unit is configured to, when the power transfer efficiency becomes lower than a predetermined threshold at the time when electric power is being transferred in the first adjusted state, switch the impedance adjustment unit from the first adjusted state to the second adjusted state.

16. The vehicle according to claim 14, further comprising:

a rectifying unit configured to rectify electric power received by the power receiving unit, wherein the impedance adjustment unit includes a DC/DC converter configured to convert a voltage from the rectifying unit and configured to supply the converted voltage to the electrical storage device.

17. The vehicle according to claim 14, further comprising:

a rectifying unit configured to rectify electric power received by the power receiving unit, wherein the impedance adjustment unit includes a matching transformer provided between the power receiving unit and the rectifying unit, the matching transformer being configured to include at least one of a coil and a capacitor.

18. The vehicle according to claim 14, wherein the impedance adjustment unit includes a switching unit configured to switch between the first adjusted state and the second adjusted state.

19. A contactless power supply system that contactlessly supplies electric power, comprising:

a vehicle; and a power transmitting device that includes: a power supply unit, a power transmitting unit and a first impedance adjustment unit, the power transmitting unit being configured to contactlessly supply electric power to the vehicle, the electric power being supplied from the power supply unit; the first impedance adjustment unit being electrically connected between the power supply unit and the power transmitting unit, and the first impedance adjustment unit being configured to adjust an impedance between the power supply unit and the power transmitting unit, the first impedance adjustment unit being configured to switch an adjusted state of the impedance between a first adjusted state and a second adjusted state on the basis of a power transfer state from the power transmitting device to the vehicle, electric power from the power supply unit in the first adjusted state being supplied to the power transmitting unit in a state where the impedance is not adjusted, the vehicle including: a power receiving unit, an electrical storage device, a second impedance adjustment unit, and a control unit, the power receiving unit being configured to contactlessly receive electric power from the power transmitting unit, the electrical storage device being configured to store electric power received by the power receiving unit, the second impedance adjustment unit being electrically connected between the power receiving unit and the electrical storage device, the second impedance adjustment unit being configured to adjust an impedance between the power receiving unit and the electrical storage device, the second impedance adjustment unit being configured to switch an adjusted state of the impedance between a third adjusted state and a fourth adjusted state on the basis of the power transfer state from the power transmitting device to the vehicle, electric power received by the power receiving unit in the third adjusted state being supplied to the electrical storage device in a state where the impedance is not adjusted, and the control unit being configured to control the second impedance adjustment unit, and the control unit being configured to switch between the third adjusted state and the fourth adjusted state on the basis of a power transfer efficiency between the power transmitting device and the power receiving unit.

20. The contactless power supply system according to claim 19, wherein
the control unit is configured to, when the power transfer efficiency becomes lower than a predetermined threshold at the time when electric power is being transferred in the third adjusted state, switch the second impedance adjustment unit from the third adjusted state to the fourth adjusted state.

* * * * *